Figure 1:
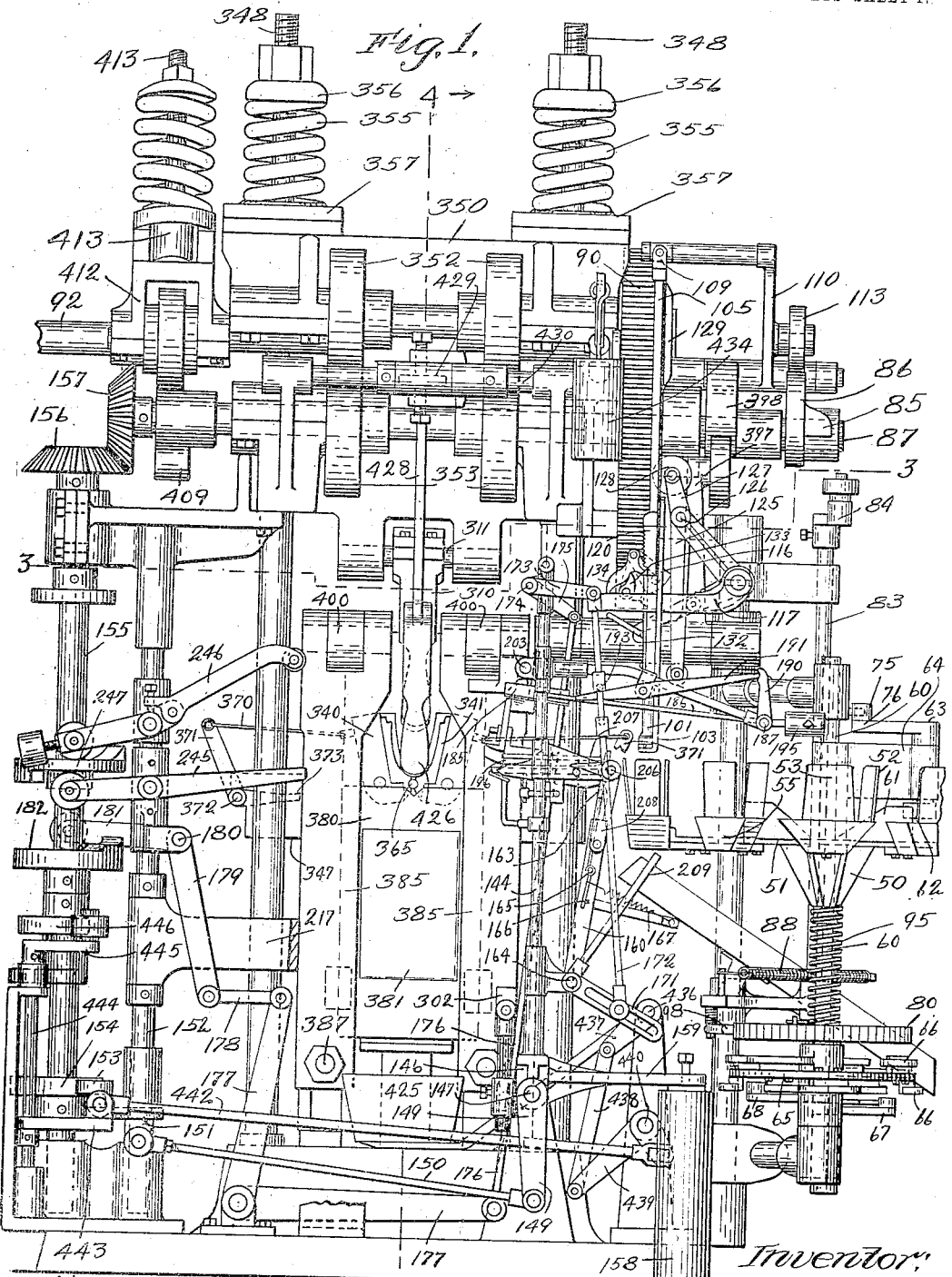

A. F. JONES.
COUNTER FORMING MACHINE.
APPLICATION FILED APR. 28, 1911.

1,097,589.

Patented May 19, 1914.
12 SHEETS—SHEET 2.

Witnesses:
H. B. Davis
J. L. O'Neill

Inventor:
Albert F. Jones
by Hayes Carrman
attys.

A. F. JONES.
COUNTER FORMING MACHINE.
APPLICATION FILED APR. 28, 1911.

1,097,589.

Patented May 19, 1914.
12 SHEETS—SHEET 4.

Witnesses
H. B. Davis.
J. L. O'Neill.

Inventor:
Albert F. Jones
by Hayes & Harriman
Attys.

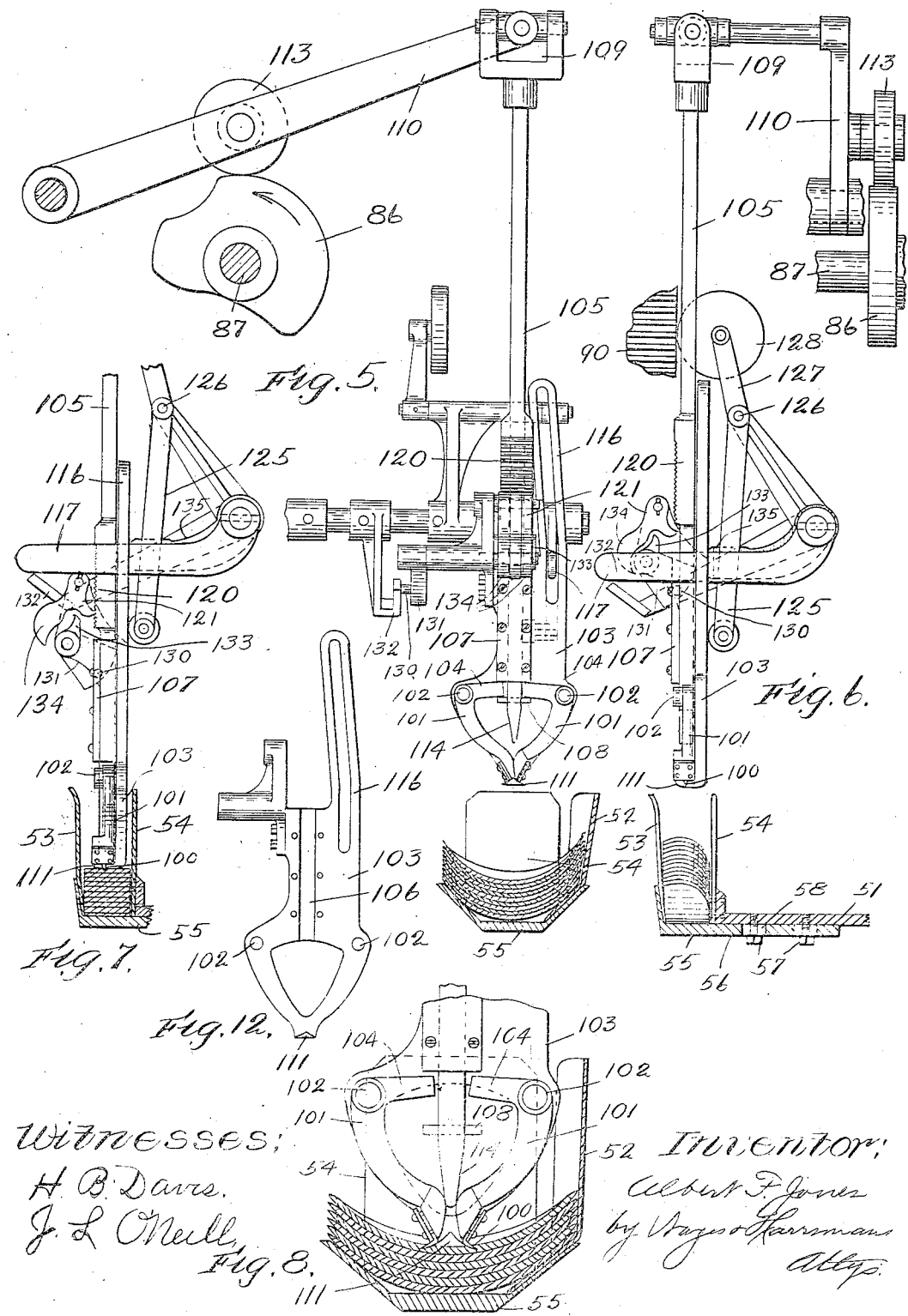

A. F. JONES.
COUNTER FORMING MACHINE.
APPLICATION FILED APR. 28, 1911.
1,097,589.
Patented May 19, 1914.
12 SHEETS—SHEET 6.
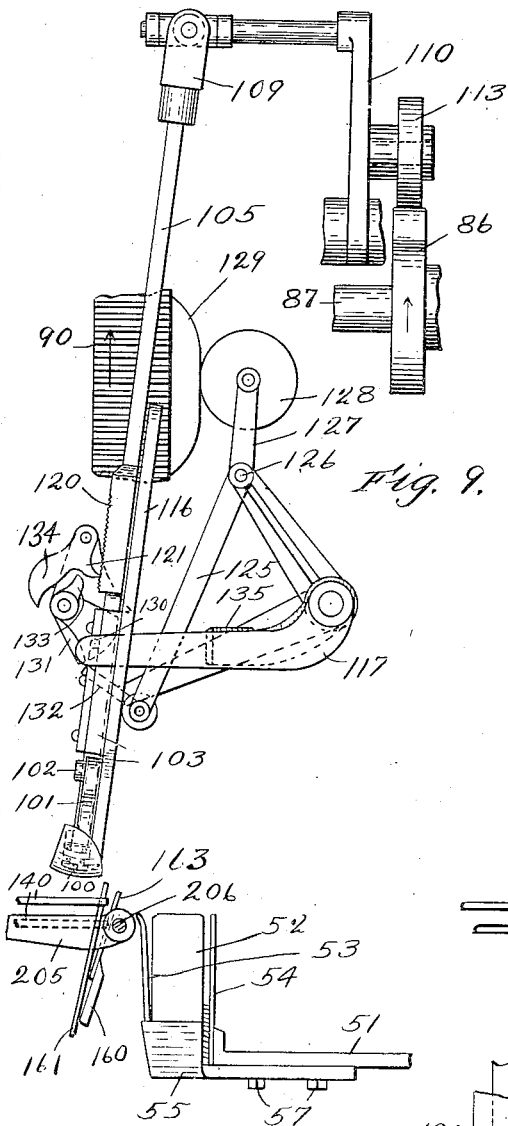
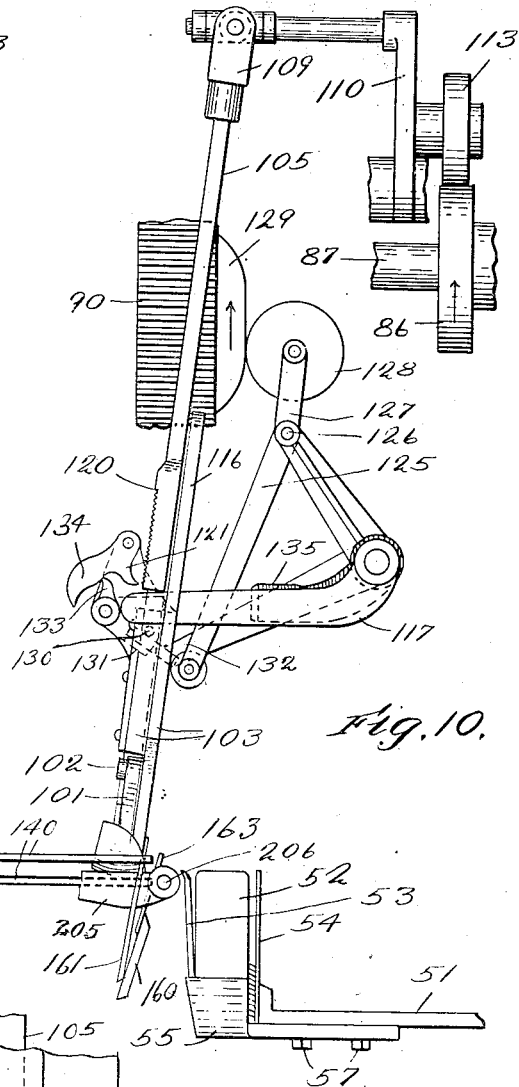
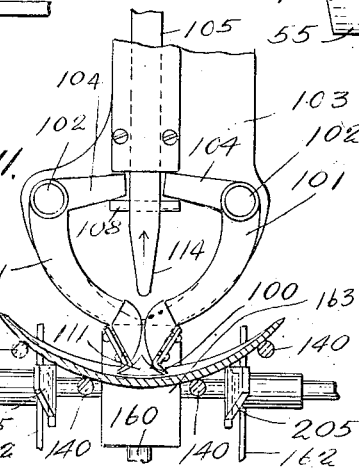
Witnesses:
H. B. Davis,
J. L. O'Neill,
Inventor:
Albert F. Jones
by Hayes Harriman
attys.

A. F. JONES.
COUNTER FORMING MACHINE.
APPLICATION FILED APR. 28, 1911.
1,097,589.
Patented May 19, 1914.
12 SHEETS—SHEET 7.
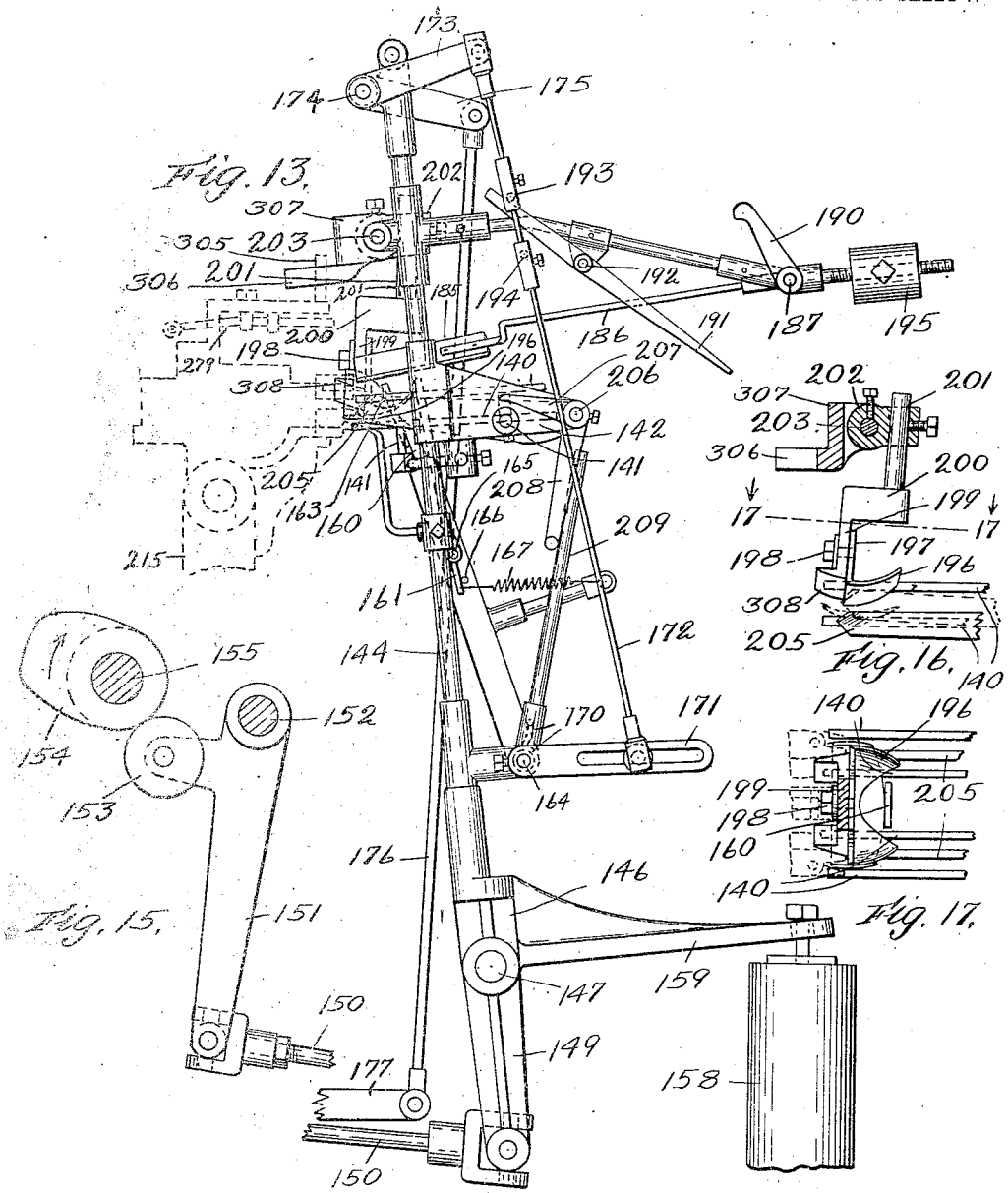
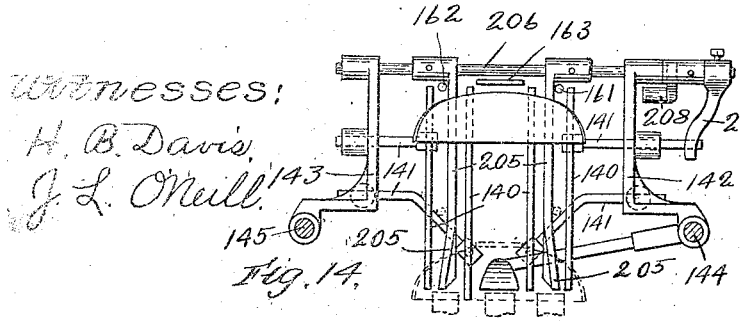

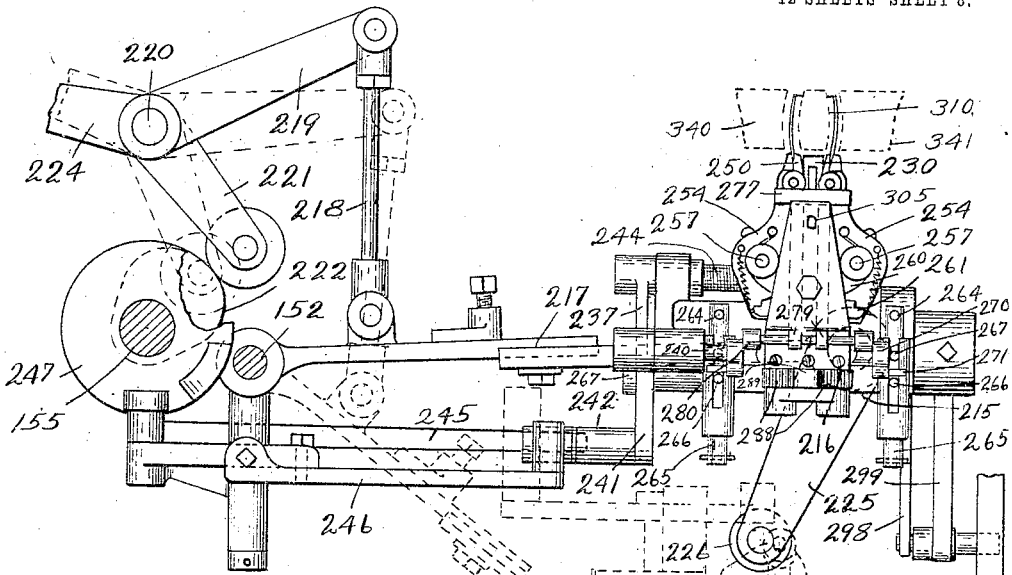
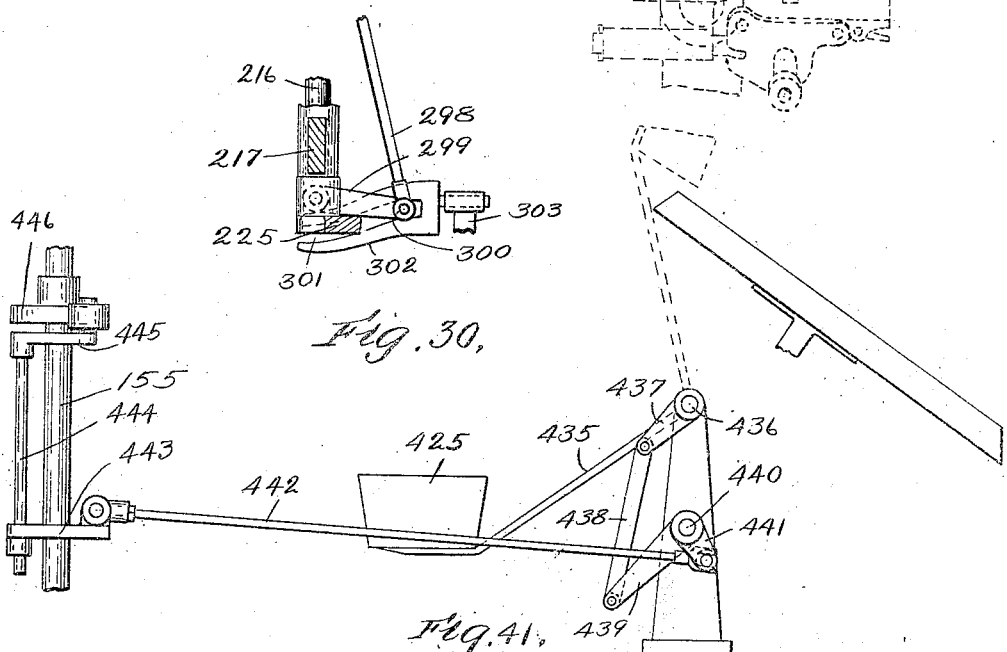

A. F. JONES.
COUNTER FORMING MACHINE.
APPLICATION FILED APR. 28, 1911.
1,097,589.
Patented May 19, 1914.
12 SHEETS—SHEET 9.
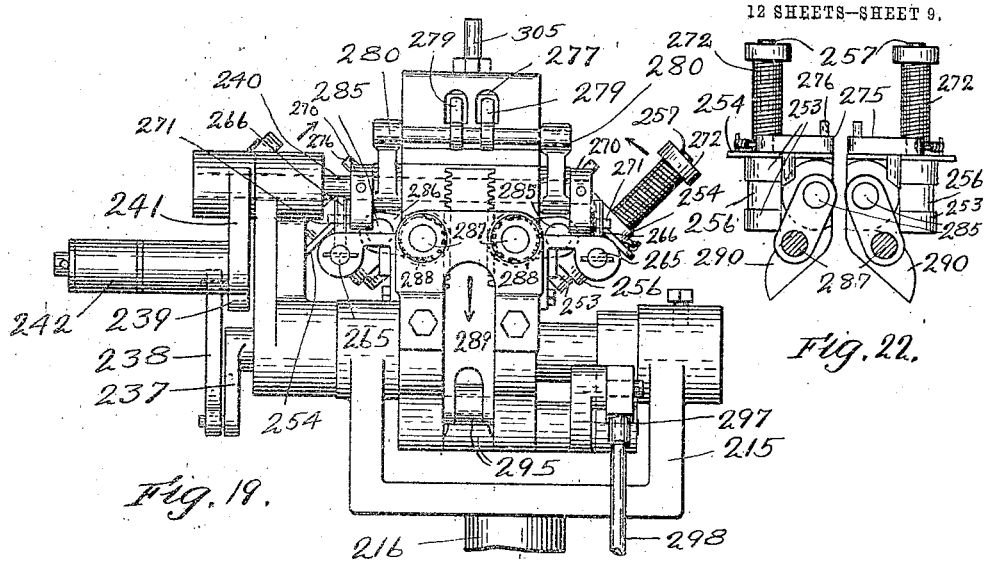
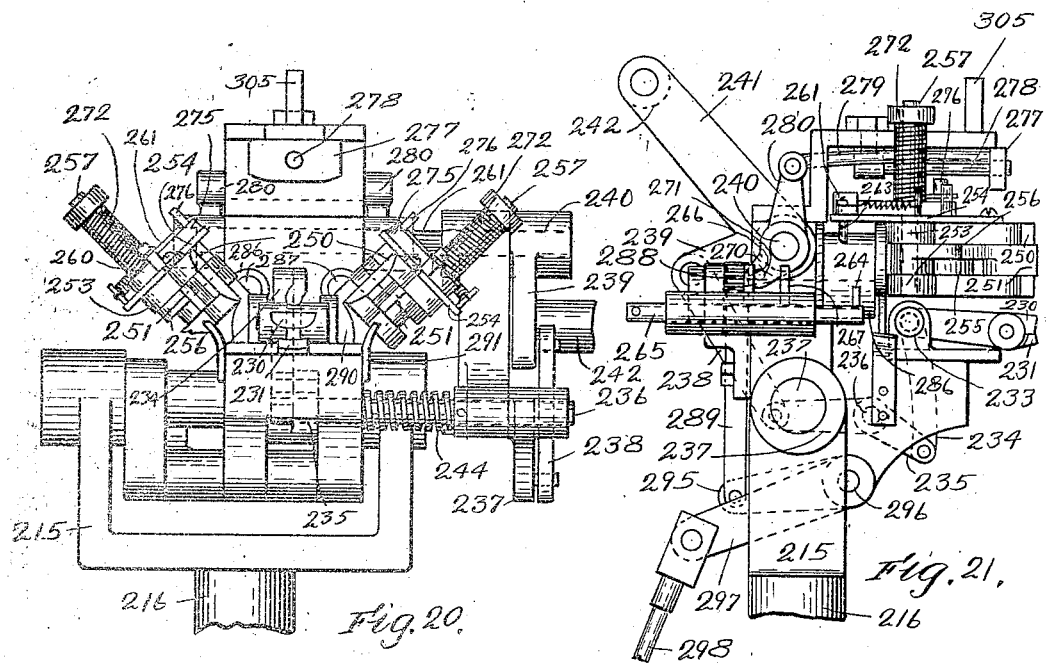
Witnesses:
H. B. Davis.
J. L. O'Neill.
Inventor:
Albert F. Jones
by Naylor Harriman,
Attys.

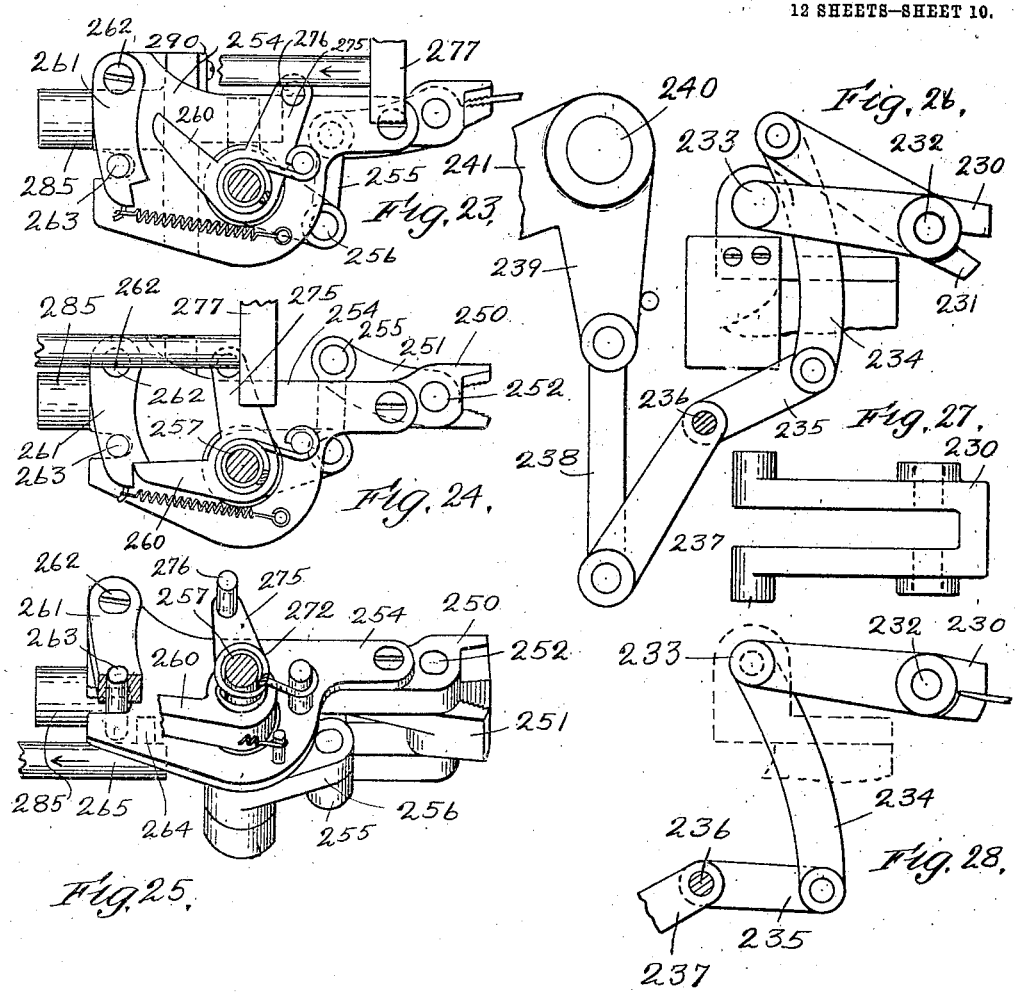
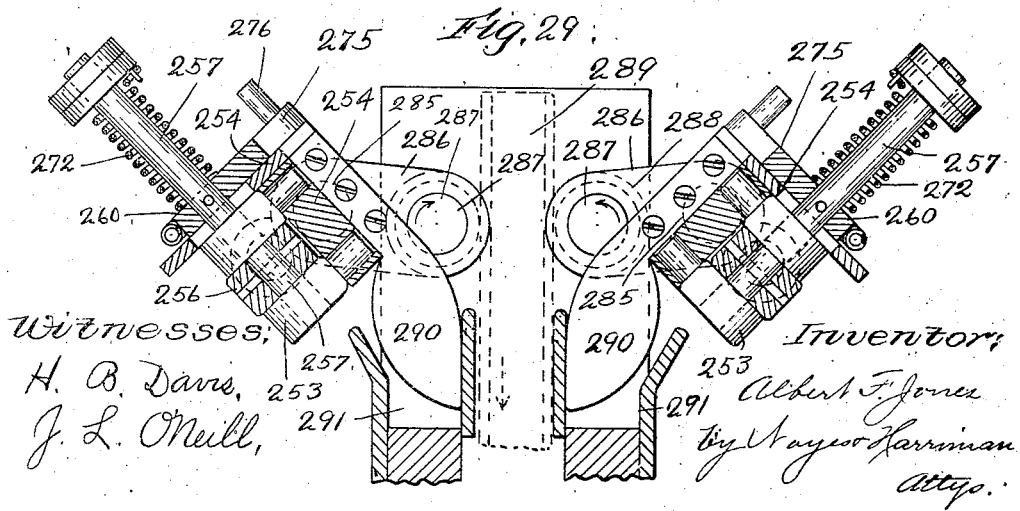

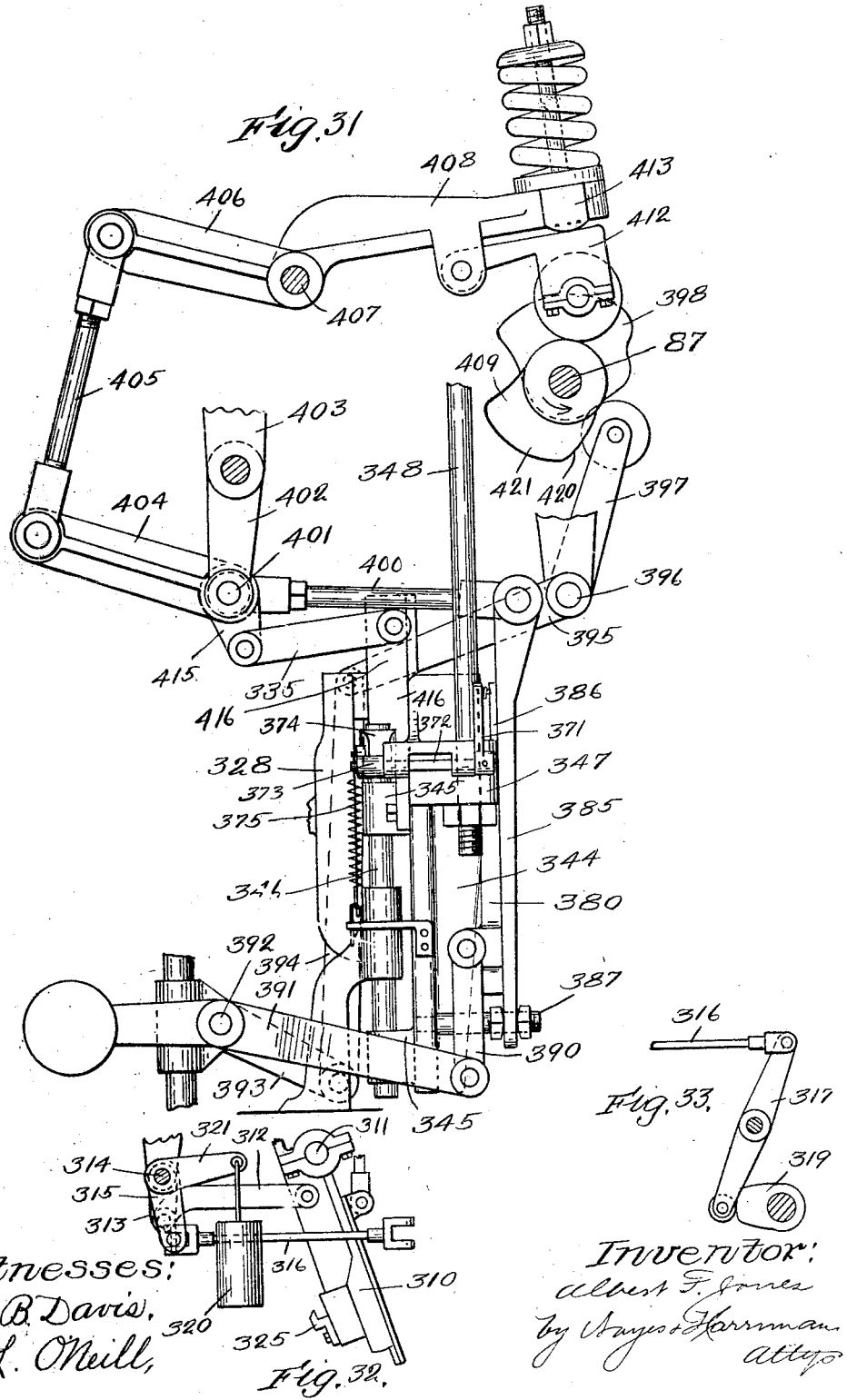

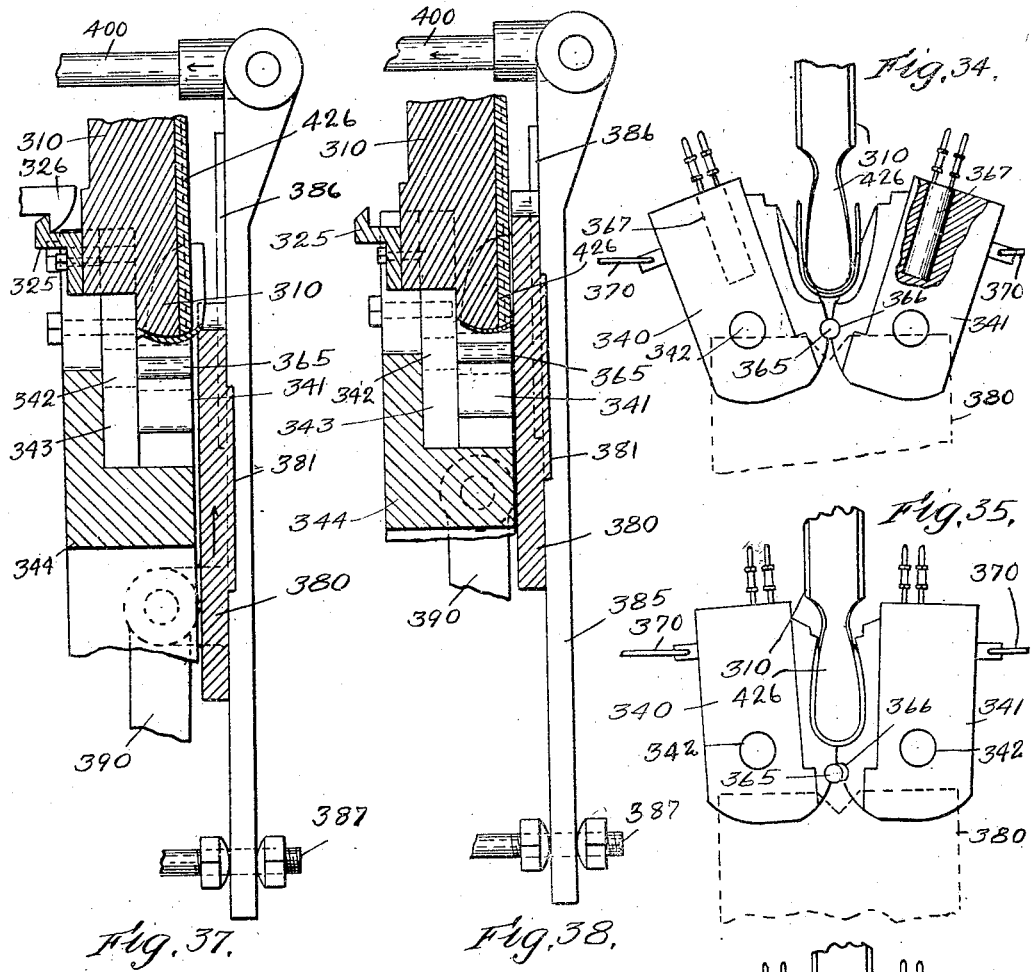

UNITED STATES PATENT OFFICE.

ALBERT F. JONES, OF SALEM, MASSACHUSETTS.

COUNTER-FORMING MACHINE.

1,097,589.  Specification of Letters Patent.  Patented May 19, 1914.

Application filed April 28, 1911. Serial No. 623,948.

*To all whom it may concern:*

Be it known that I, ALBERT F. JONES, a citizen of the United States, residing at Salem, in the county of Essex and State of Massachusetts, have invented an Improvement in Counter-Forming Machines, of which the following is a specification.

This invention relates to counter-forming machines such as shown in my application for Letters Patent #498,411, filed May 26, 1909, and in some particulars is an improvement on said machine.

In the present embodiment of my invention the counter-blanks which have been previously curved longitudinally and preferably transversely, are arranged in small piles in holders borne by a turret which is movable rotarily but intermittently in a horizontal plane, said holders being open at the top to admit of the introduction of a pick-up device, by which the blanks are removed one at a time. Said turret is arranged with any one of the holders beneath the pick-up device and is adapted to be moved to bring the several holders successively beneath said device. Retaining-means is provided to hold the turret in its different positions, which is designed to be operated to disengage the turret and permit it to revolve only upon the completion of several successive operations of the machine, so that the turret is caused to dwell in each of its different positions while several blanks are being removed from each pile by the pick-up device.

The pick-up device is constructed and arranged to engage the top blank of a pile contained in the holder which, at the time, occupies a position beneath it, and to remove said top blank from the pile and convey it to a blank-adjuster, and said pick-up device has diverging spurs arranged to penetrate the surface of the blank in opposite diagonal directions, to thus positively engage said top blank of the pile, and means are provided to operate said pick-up device to engage the top blank of the pile and cause the spurs to penetrate the surface of the blank, and to remove the blank from the holder and to convey the blank to and deliver it upon the blank-adjuster. The blank-adjuster is movable to convey the blank which is delivered to it by the pick-up device to the feeding-and-bending device, and said blank-adjuster is an important feature of the machine, in that it provides for correcting the position of the blank, as for instance, with respect to the feeding-and-bending device, so that it may be correctly presented to said device, to be engaged by it and subsequently delivered to the molding or compressing-mechanism. As the blanks are arranged more or less promiscuously in the holders, although in piles, and furthermore, as they are inclined to be warped more or less out of true, the employment of a blank-adjuster is necessary. Said blank-adjuster has a horizontal bed upon which the blank is deposited by the pick-up device, and has means to engage the edge of the blank and by pushing it along on the horizontal bed to correct its position with respect to the feeding-and-bending device while it is being moved along. It also has means to engage the ends of the blank while on the bed to move said blank endwise, and thus bring its ends into the same or some predetermined plane. When the ends of the blank are brought into the same plane the sides of the counter will be of equal length, and when said ends are brought into an inclined plane, as is possible by the means embodying this invention, the sides of the counter will be of unequal length, and such counters having one side longer than the other may be used as rights and lefts. It also has curved forming-means to correct the longitudinal curvature of the blank, in order that such curvature may correspond to the arc of the several pairs of nippers of the feeding-and-bending device. Said curved forming-means is arranged at the front end of the horizontal bed, so that the blank will be correctly formed as it is thrust into the jaws of the several pairs of nippers which are borne by the feeding-and-bending device. When the edge of the blank is thrust between the open jaws of the nippers, and said jaws close upon it the tendency is for the blank to be tipped up or otherwise displaced, particularly on account of its transverse curvature, unless positively held at such time, hence means are provided to positively engage the blank when in this position and hold it while the jaws close upon it, and herein such means consists of lifting-levers adapted to be operated to press the blank against the curved forming-means, and thus not only hold the blank against displacement, but also hold it in its correctly curved position.

The feeding-and-bending device is designed to take the blank from the blank-adjuster and convey it to the compressing-mechanism, and to bend it into heel-form while in transit. Said feeding-and-bending device comprises a middle pair of nippers, arranged in a horizontal plane to engage the heel of the blank, and two side pairs of nippers inclined in opposite ways with respect to the middle pair, to engage the sides of the blank, thus adapting them to engage the curved blank. The middle pair of nippers is loosely supported to accommodate the upward movements of the compressing-jaws relative to the former when the blank is first projected therebetween, and while still held by the several pairs of nippers, and the two side pairs of nippers are adapted to oscillate on horizontal axes and also to be lifted bodily in the arc of a circle, to the side portions of the blank engaged by them in an upward and inward direction. Automatic means are provided for opening and for closing the nipper-members at the proper time, and automatic means are provided for lifting the two pairs of side nippers and for turning them on their axes. The several pairs of nippers are arranged on a head which is adapted to oscillate, and said oscillating head is arranged on a movable support, to thus present the nippers first to the blank-adjuster and then to the compressing-mechanism, and means are provided to oscillate said head, and to move said support. Coöperating centering-means are arranged on the oscillating-head and blank-adjuster, to enable said parts to be correctly disposed when in engagement with each other; and means are arranged on the blank-adjuster to engage some of the nipper-members, to hold them in correct position with respect to the curved forming-means on the blank-adjuster. The blank is presented edgewise to the compressing-mechanism and is held by the blank-engaging nippers engaging its straight edge until its curved edge-portion is engaged by the compressing-mechanism, when it is disengaged, and the blank-engaging nippers then return to obtain the next blank from the blank-adjuster.

The compressing-mechanism comprises essentially a former of heel-form, and a pair of compressing-jaws arranged at opposite sides of the former, said former and compressing-jaws constituting a mold, and each jaw has a molding-face including one-half of the counter, and said jaws are pivotally supported at their lower ends to be moved toward and from the former, and they are also provided with means to engage each other, so that they are caused to move alike. The compressing-jaws are arranged on a vertically movable support or jaw-carrier, movement of which in turn moves the jaws toward and from the former, and means are provided to turn the jaws on their pivots in a direction toward and from the former while the jaws are being moved by said vertically movable support. Said jaws are moved toward the former and are turned on their pivots quickly during the initial movement of their operating-means, and are moved slowly in the same directions to exert upon the blank a gradually increasing pressure during the subsequent movement of said operating-means, so that the blank is first positioned on the former and slightly compressed and is then severely compressed during a long period of time to give to it a permanent set.

The straight edge of the blank which is engaged by the several pairs of nippers while presenting the blank to the compressing-mechanism is utilized as the flange for the counter, and said edge is turned inward by a flanging-device to form said flange. The flanging-device employed for this purpose consists essentially of a flat plate which is movable over the face of the mold to turn said straight edge inward over upon the former, and, herein, said plate is supported so as to first engage the straight edge of the blank at its heel end at a distance quite remote from the face of the mold so as not to break the blank by forming a sharp bend too quickly, and as it advances it is caused to gradually approach the face of the mold to thus lay down the flange which is being turned in by it, so that when it arrives at the end of its stroke the flange is turned in and laid down and is firmly engaged over all. Said flanging-plate is preferably supported at an inclination with respect to the face of the mold and is gradually moved into parallel therewith as it advances. Means are provided to move said flanging-plate over the face of the mold and means are also provided to move said flanging-plate in a direction toward the face of the mold while it is being moved over said face. When the flange has been turned in and laid flat upon the former, it is necessary to then subject it to a severe flat pressure, to permanently set it, and to accomplish this result means are also provided for moving said flanging-plate in a direction toward the face of the mold with a severe pressure at the end of its stroke, or when the flange has been completely formed.

Means are provided for moving the former forward to bring its lower end out of the plane of the compressing-jaws, to permit the discharge of a molded-counter, and a discharging-device is arranged on the former which acts to remove the molded counter therefrom; and a receptacle is provided to receive the discharge counter having means to move it to deliver the molded counter to a chute.

Figure 2:
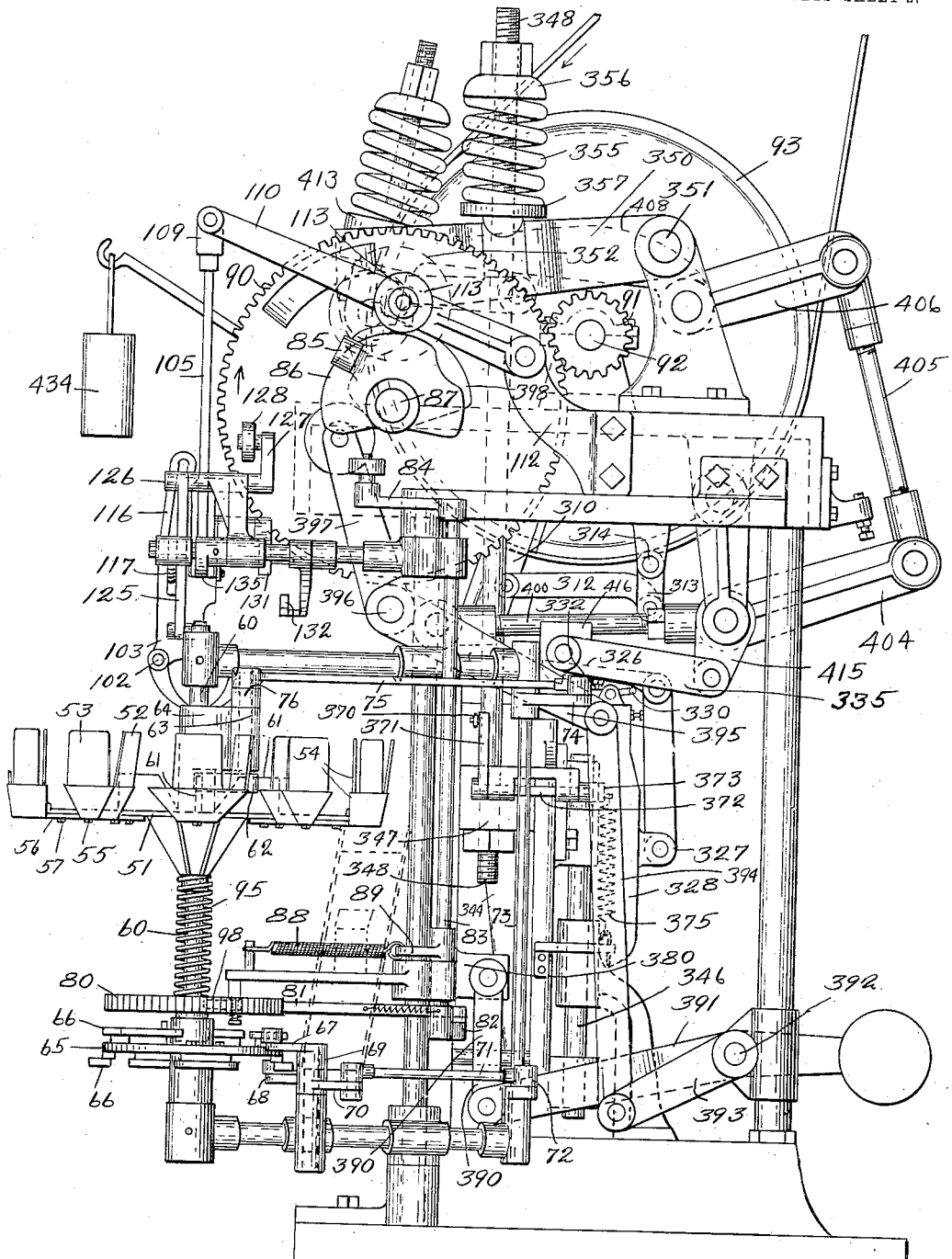
Figure 3:
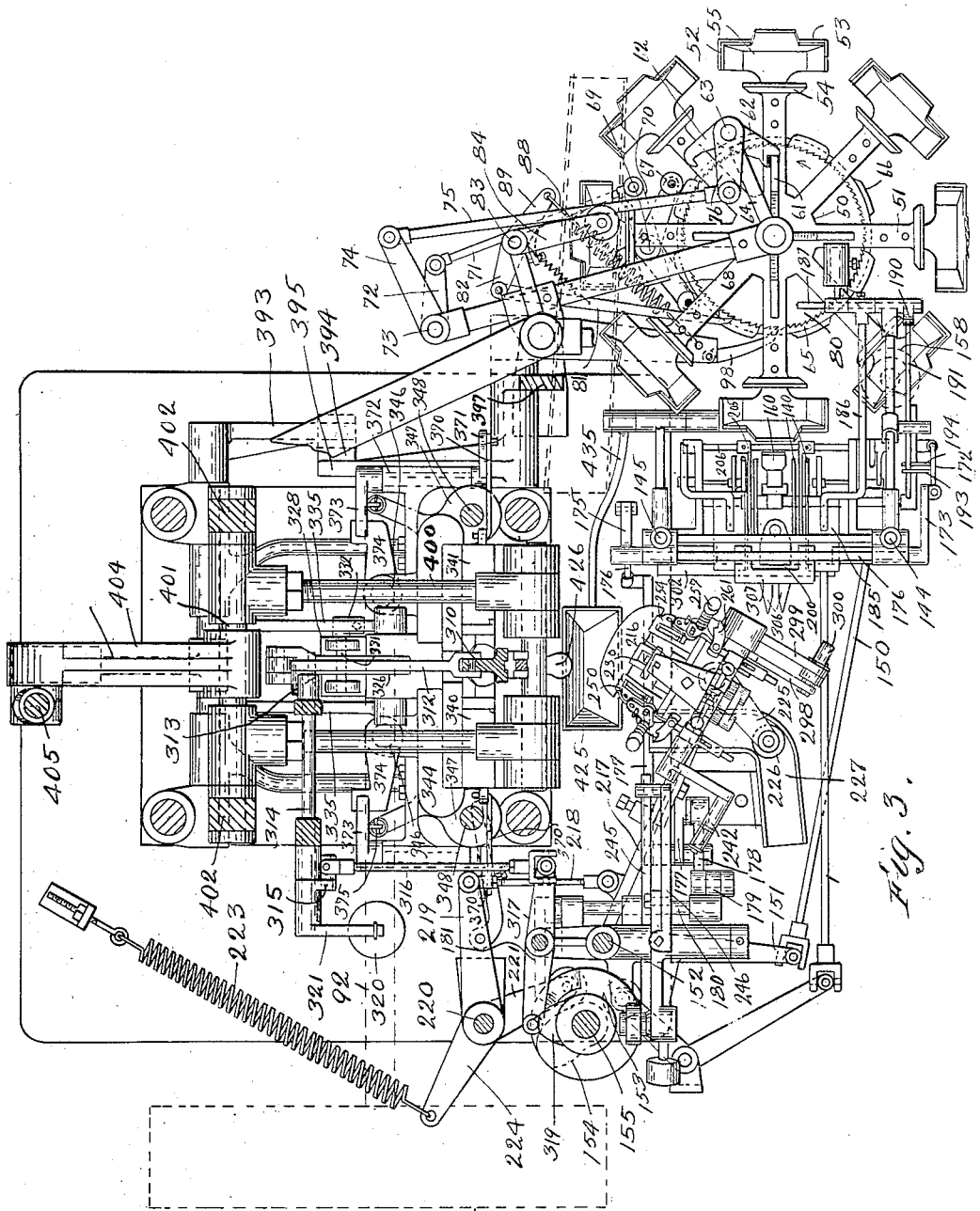
Figure 4:
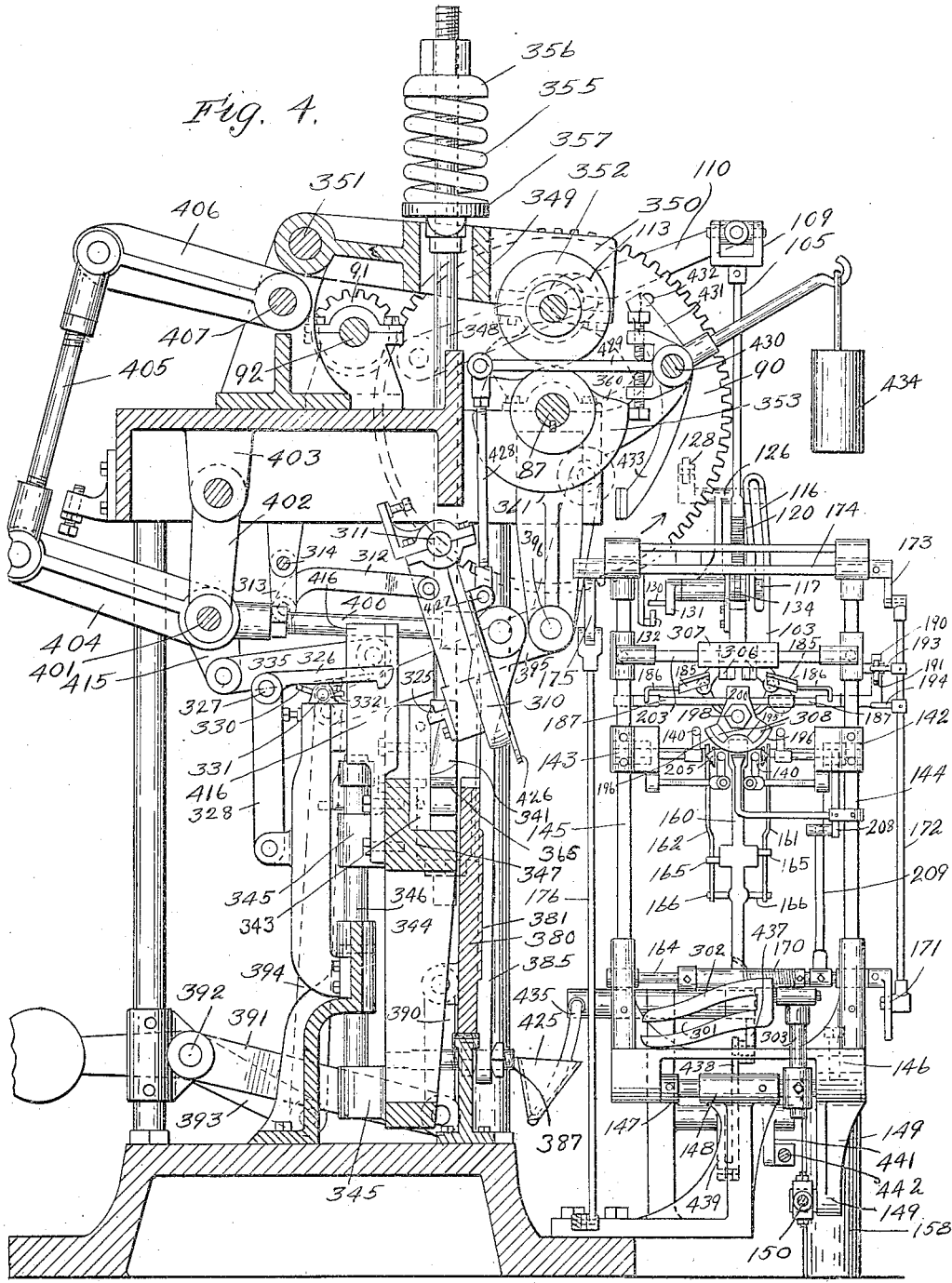

Figure 1 is a front elevation of a counter-forming machine embodying this invention, the feeding-and-bending device being omitted. Fig. 2 is a side elevation of the machine shown in Fig. 1. Fig. 3 is a horizontal section of the machine shown in Fig. 1, taken on the dotted line 3—3. Fig. 4 is a vertical section of the machine shown in Fig. 1, taken on the dotted line 4—4. Figs. 5, 6, 7 and 8 are enlarged details of the pick-up device to be referred to, in connection with one of the blank-holders. Figs. 9, 10 and 11 are enlarged details of the pick-up device to be referred to, in connection with one of the blank-holders and a portion of the blank-adjuster. Fig. 12 is a detail of the sliding-frame of the pick-up device. Fig. 13 is an enlarged side elevation of the blank-adjuster. Fig. 14 is an enlarged detail showing in plan view the horizontal bed of the blank-adjuster. Figs. 15, 16 and 17 are enlarged details of portions of the blank-adjuster. Fig. 18 is an enlarged plan view of the feeding-and-bending device, the full lines representing the device in the position it will occupy when delivering a blank to the compressing-mechanism. Fig. 19 is an enlarged rear elevation of the head of the feeding-and-bending device. Fig. 20 is a front elevation of the head shown in Fig. 19. Fig. 21 is a side elevation of the head shown in Fig. 19. Fig. 22 is a detail of the two pairs of side blank-engaging nippers. Fig. 23 is a side elevation of one of the side pairs of nippers, the nipper-members being closed. Fig. 24 is a view similar to Fig. 23, the nipper-members being open. Fig. 25 is a perspective view of the pair of side nippers shown in Fig. 24. Fig. 26 is a side elevation of the middle pair of nippers. Figs. 27 and 28 are detailed views of parts of the middle pair of nippers. Fig. 29 is an enlarged vertical section of the supports and operating-means for the two pairs of side nippers. Fig. 30 is a detail of the means to lift and turn the two pairs of side nippers. Fig. 31 is an enlarged side elevation of the flanging and compressing-device. Figs. 32 and 33 are details of the means to move the former forward to discharge the molded-counter. Fig. 34 is a detail of the compressing-jaws in their normal position. Fig. 35 is a view similar to Fig. 34, the compressing-jaws being in engagement with the blank on the former at the end of the initial movement. Fig. 36 is a view similar to Fig. 35, the jaws having been moved to subject the blank to its final pressure. Fig. 37 is an enlarged vertical section of the flange-turning and compressing-device, the parts having been moved a short distance. Fig. 38 is a view similar to Fig. 37, the flange-turning and compressing-device having been completely operated. Figs. 39 and 40 are enlarged details illustrating the action of the flanging-plate in forming the flange. Fig. 41 is a detail view of a receptacle to receive the discharged counter, and means to lift it to convey said counter to a chute.

The counter-blanks, which have been previously curved lengthwise and crosswise by means not here shown, as such means forms no part of this invention, are arranged in small piles in shallow holders borne by a horizontally arranged turret.

50 represents the hub of the turret, and 51 its radially extended arms which bear at their extremities the holders for the piles of blanks. Said holders are open at the top and comprise a bottom wall 55, having upwardly extended inclined portions at each end and at the front, an upward extension 52 secured to one end portion, and an upward extension 53 secured to the front portion, the holder being thus open at one end for the introduction of the blanks, and to accommodate blanks of different lengths. One of the walls, as for instance, the front wall 53, is made adjustable toward and from the back wall to admit of holding blanks of different widths. Referring to Fig. 6, the back wall 54 is rigidly connected with the arm 51, and the front, end and bottom walls are connected together and to a short arm 56, which is extended from the bottom wall beneath the arm 51, and is attached to said arm by bolts 57 passing through slots 58 in said arm, permitting longitudinal adjustment thereof.

The turret is loosely mounted on a vertical rod 60, forming a part of the main frame, and is adapted to be moved rotarily about said rod as an axis to bring one or another blank-holder into position beneath a pick-up device. The turret is held stationary in its different position by suitable retaining-means which engages it, and which is adapted to be operated to disengage it and permit it to be moved until again engaged thereby, thus rotary movement of the turret is intermittent, and said turret is caused to dwell in each different position while the pick-up device is operated several times to remove from each blank-holder several blanks. As a retaining-means for the turrets, as here shown, detents 61 are arranged on the upper sides of the arms of the turret, adapted to be engaged by one or the other end of a double detent-lever 62, secured to the lower end of a short shaft 63, having its bearings in an arm 64 on the frame. The shaft 63 is oscillated to move the detent-lever 62, to disengage and engage the detents on the turret, thus permitting the turret to move one step on each movement of said detent-lever. As here shown, the turret carries eight blank-holders, equidistantly arranged, and is provided with four detents 61, also equidistantly arranged, and while one of the detents is engaged by one end of the detent-lever (see Fig. 3), the other end of said detent-lever is removed from the path of movement of the detents, but when the short shaft 63 is turned the detent-lever is moved to disengage the detent and its opposite end moved into position to engage the same detent and will engage it when the turret has moved one step; then when said short shaft is again moved, but in the opposite direction, said detent is again disengaged and the opposite end of the detent-lever moved into position to engage the next detent and will engage it when the turret has moved another step, and so on, thus intermittently disengaging the turret and permitting it to revolve. Means are provided for oscillating said short shaft when the machine has made a predetermined number of operations and a corresponding number of blanks have been removed from any of the blank holders, and, as here shown, said means comprises a disk 65 mounted on the rod 60, and adapted to be revolved intermittently, and bearing several cams 66, here shown as eight in number, arranged four above and four below the disk, the cams on each side of the disk being equidistantly arranged, and the cams on one side being arranged alternately with respect to those on the other; and a pair of oppositely extended cam-levers 67, 68, are arranged to be moved by said cams, said levers being arranged in different planes, one above the other, whereby they may be engaged respectively by the cams on the opposite sides of the cam-disk, and both levers are secured to a hub 69 mounted on a stub-shaft at one side of the rod 60, and an arm 70 extends from said hub which is connected by a link 71, with an arm 72, secured to the lower end of a vertical shaft 73, bearing at its upper end an arm 74, which is connected by a link 75 with an arm 76 rigidly secured to the shaft 63 of the detent-lever. As one or the other cam-lever is moved by the cams on the disk the hub 69 bearing them is oscillated and by the connections between said hub and the shaft 63, said shaft 63 is likewise operated to move the detent-lever and disengage the turret.

To revolve the disk 65 intermittently it has connected with it a ratchet-wheel 80, which is also mounted loosely on the rod 60, and said ratchet-wheel is advanced step by step by a pawl 81, pivotally connected to the arm 82, secured to an upright shaft 83, having is bearings in the main frame and bearing at its upper end an arm 84, with or without a roll thereon, which is adapted to be engaged and moved by a projection 85, arranged on one side of the cam-disk 86, which is secured to the main-shaft 87 of the machine. And once during each revolution of said main-shaft 87, said arm 84 is engaged and moved and the shaft 83 oscillated and the pawl 81 caused to advance the ratchet-wheel 80 one step. The shaft 83 is restored to normal and the pawl 81 moved to engage the next tooth of the ratchet-wheel by a spring 88, which is attached at one end to the frame and at the other end to an arm 89, on the shaft 83. The pawl is held in engagement with the ratchet-wheel by a spring. Backward rotation of the ratchet-wheel is prevented by a pawl 98, pivotally connected to the frame. The main-shaft 87, bears a large gear 90, which is engaged by a pinion 91, secured to the driving-shaft 92, bearing a belt-pulley 93. Thus the cam-disk 65 is moved intermittently by the means operated by the main shaft, but as the cams on said disk are quite long and widely separated, they will not operate to move the detent-lever only after said disk has been moved several steps, thus permitting the turret to dwell in each position it may occupy while the machine makes a predetermined number of revolutions, which is determined by the number of teeth which may be cut on the ratchet-wheel. It will be observed that in a distance equal to the length of each cam and the succeeding space quite a number of teeth are cut on the ratchet-wheel.

As the means to move the turret I herein employ a strong coiled spring 95, arranged on the rod 60, the upper end of which is attached to the turret and the lower end to the ratchet-wheel, and as said ratchet-wheel is advanced step by step said spring is caused to accumulate sufficient power to move the turret by the time the turret is disengaged and permitted to move. Thus it will be seen that the several blank-holders are successively presented to the pick-up device, each being permitted to dwell while the machine makes a predetermined number of operations.

The pick-up device by which the blanks are taken from the tops of the piles in the holders and conveyed to the blank-adjuster will now be described.

Referring particularly to Figs. 5 to 12, 100 represents a pair of sharp pointed spurs divergingly arranged at the extremities of a pair of converging arms 101, of a pair of bell-crank levers, which are pivoted at 102, to a frame 103, the arms 104 of said bell-crank levers extending inward toward each other and adapted to be engaged by suitable means to turn the levers on their pivots. The extremities of the converging arms are normally in contact with each other, see Fig. 5, and as said arms are spread the diverging spurs are caused to penetrate the surface of the blank in opposite diagonal directions, and thus obtain a firm engagement therewith, so as to lift it from the holder, and subsequently as said arms are restored to normal said spurs are withdrawn from the blank to disengage it. The frame 103 bearing said levers is shown separately in Fig. 12, and has at its lower end a boss 111 of inverted V-shape, which occupies a position between the diverging spurs, and being thus located with respect to said spurs acts as a presser-foot to engage the top blank of a pile and thus hold the blanks from displacement while the spurs penetrate its surface. The frame 103 is slidably connected to a bar 105, said frame having a groove 106 to receive the bar and having a plate attached to it which covers said groove and the bar contained therein. The upper end of said bar 105 is connected by a universal joint connection 109, with the extremity of a lever 110, pivotally supported on a bracket 112 on the frame, and said lever bears a roll 113, which engages the edge of a cam 86.

It is desired that the frame 103 and parts borne by it shall move downward in a straight line or thereabout, notwithstanding it is connected with the bar 105, which is connected to the extremity of the arm 110, which moves about an axis, but as a swinging movement of said bar 105 with respect to the arm 110 is permitted, advantage is taken of the fact, and the frame 103 is provided with an upward extension 116, which is slotted lengthwise in a diagonal direction to receive a fixed arm 117 on the main frame, so that as the bar 105 and frame 103 are moved up and down they will be gradually swung and thus caused to move in a direct line toward the blank. To hold the sliding frame 103 on the bar when the latter is in its normal or elevated position, and also to move the bell-crank levers into and hold them in their normal positions, see Fig. 5, a cross-bar 108 is extended through the bar 105 at a point near its lower end, and the arms 104 of said levers extend over the ends of said cross-bar, and are engaged thereby and the levers are turned on their pivots until the lower ends of the converging arms engage each other, whereby further movement of said levers is prevented, and the frame 103 is thus supported by the cross-bar 108, engaging the arms 104, which, when in normal position, are held fixed by the engagement of the converging arms. The cam 86 is cut away entirely at one side, so that when such cut-away portion comes opposite the roll 113 and the lever 110 is permitted to fall, the bar 105 carrying the frame 103 is permitted to descend by gravity. Such downward movement of the bar and frame continues until the presser-foot 111 strikes the top blank of a pile, regardless of the height of the pile, and at such time further downward movement of the frame 103 is prevented, while further downward movement of the bar 105 is permitted. As the bar 105 continues to move downward independently of the frame, the cross-bar 108 moves out of engagement of the arms 104 of the bell-crank levers, thus permitting the converging arms to be spread to cause the spurs to penetrate the surface of the top blank of the pile. The lower end of the bar 105 is designed to be employed as a spreading-means for the converging spur-carrying arms, and, as here shown, said lower end is made wedge-shaped, as at 114, to enter between the extremities of said arms and thus spread them, see Fig. 8, and force the spurs into the top blank.

When the frame 103 has been moved downward into the position shown in Fig. 8, and the spurs thrust laterally to firmly engage the blank, it is necessary to lock the spurs in such position and rigidly connect the frame 103 with the bar 105, in order that said bar, when raised, will act to lift said frame and abnormally disposed spurs and the blank engaged by them, and to accomplish this result a locking-device is here shown, consisting of a ratchet-toothed bar 120, arranged on a portion of the bar 105, and one or more pawls 121, three being here shown, to engage said ratchet-toothed bar, which are pivotally supported on a bracket on the frame 103, and when the bar 105 is moved downward independently of the frame 103, said ratchet-toothed bar 120 moves over the pawls, permitting engagement of the pawls therewith, see Fig. 7, so that when the bar is subsequently lifted the frame 103 will be lifted by it, together with the blank engaged by the spurs, although said frame at such time is in its abnormal position with respect to the bar. Said pawls may act by gravity when permitted but must be positively moved to disengage the ratchet-toothed bar, hence they will remain in engagement until thus positively moved. The bar 105 is raised by the cam 86, and when thus raised is ready to be swung on its universal joint connection to move the blank carried by the spurs into a position above the blank-adjuster, as shown in Fig. 9. Such swinging movement of the bar is accomplished by the lever 125, secured at one end to a short shaft 126, supported by the main-frame, the opposite end of said lever being arranged to engage the back of frame 103, and a lever 127 is also secured to said shaft 126, bearing a roll 128, adapted to be engaged by a cam-projection 129, arranged on the side of the large gear wheel 90, so that during each revolution of said gear-wheel, which, it will be understood represents one complete operation of the machine, said lever 125 is moved to swing the bar and frame. When the bar and frame arrive in the position shown in Fig. 9, they are caused to again descend to deliver the blank to the adjuster, and this result is accomplished by the aforesaid cam 86, permitting the arm 110 to again descend together with the parts borne by it. As the bar and frame again descend a pin 130, projecting laterally from a plate 131 pivoted to a bracket on the frame, 103, is caused to engage the inclined side of a plate 132, which is stationarily supported on the main-frame, and said plate 131 is moved and a dog 133 on the pivot-shaft of said plate is moved by it into position to engage an extension 134 on the pawl or pawls 121, acting to disengage them from the ratchet-toothed bar. The frame 103 is thus disengaged from the bar 105, so that said bar may be moved upwardly independently of said frame. The bar 105 is then moved upward and the cross-bar 108 engages the arms 104 of the bell-crank levers and turns said levers on their pivots and withdraws the spurs from the blank, thus disengaging the blank. By this time the cam 129 has passed by the roll 128, so that the bar 105 and parts borne by it are permitted to resume their normal position, as shown in Figs. 5 and 6, returning by gravity and striking against a buffer 135, which limits their return movement.

The blank-adjuster to which the blank is delivered by the pick-up device will now be described. Said blank-adjuster receives the blanks from the pick-up device and conveys them to a feeding-and-bending device, by which they are delivered to the molding or compressing-device, and as it is necessary that the blanks shall be delivered by the feeding-and-bending device to the molding or compressing-device with the utmost precision as regards their position, it is necessary that they shall be presented to the feeding-and-bending device with the same precision as regards their position, and the blank-adjuster is employed to thus adjust the position of the blanks. It will be understood that the blanks contained in the holders are not adjusted as regards their position, and no attempt is made to do so, hence when removed from the holder they may or may not be correctly disposed to be engaged by the feeding-and-bending device.

Referring particularly to Figs. 1 to 4 and 9 to 17, illustrating the blank-adjuster, it will be observed in Fig. 10 that the blank is delivered by the pick-up device and deposited upon a horizontal bed, here shown as composed of a plurality of wires 140, arranged in parallel, four wires ordinarily being sufficient. Said wires are attached to supports 141, preferably made adjustable and arranged at different elevations to receive the longitudinally curved blank, the two outside wires being arranged in a horizontal plane above the two inside wires, see Fig. 11.

The supports 141 are all angularly formed and those on one side extend to and are connected with a bracket 142, and those on the other side extend to and are connected with a bracket 143, and said brackets are attached respectively to upright bars 144, 145, which form the vertical bars of the frame of the blank-adjuster. Said upright bars are connected together rigidly at their lower ends by a yoke 146, and said yoke is supported on a horizontal cross-bar 147 having its bearings in a bracket 148, attached to the main-frame. The adjuster-frame is permitted to oscillate on said bar 147 and the extent of its oscillation is sufficient to move the blank-supporting bed from a position with its rear end beneath the pick-up device to a position with its front end in engagement with the feeding-and-bending device, so that the blank when moved along on said bed will be delivered to said feeding-and-bending device.

In Fig. 1 the blank-adjuster is represented in position to receive the blank from the pick-up device, and the pick-up device is in its normal position above the blank-holder, and in Figs. 9 and 10 the pick-up device is moved to deliver the blank to the blank-adjuster, and in Fig. 13 the blank-adjuster is moved into position to deliver the blank to the feeding-and-bending device. The blank-adjuster is oscillated at regular intervals in correspondence with the operations of the machine, and to accomplish this result said yoke 146 has a downwardly extended arm 149 to the extremity of which one end of a link 150 is connected, the opposite end of said link being loosely connected to the extremity of an arm 151, see Fig. 15, pivotally supported on an upright bar 152 of the main frame, said arm bearing a roll 153 which is engaged by a cam 154, secured to the upright gear-shaft 155, which, as here shown, has a bevel-gear 156 at its upper end, which is engaged and driven by a bevel-gear 157, secured to the main-shaft 87. The adjuster-frame is moved in one direction by said cam 154, and is returned by a weight 158 attached to an arm 159 on said frame.

The blank is adjusted on its bed to bring its front straight edge in parallel with the jaws of the feeding-and-bending device by means engaging its rear or curved edge, and, as here shown, the means employed to push the blank along on the bed is also employed to thus adjust it. A middle and two side blank-pushing arms are employed for this purpose, 160 representing the middle arm and 161, 162 the two side arms. The middle arm is made quite long and has a flat plate 163 at its upper end to engage the edge of a blank on the bed, and its lower end is mounted loosely on a horizontal shaft 164, having its bearings in the side arms of the adjuster-frame to oscillate thereon. The two side arms 161 and 162 are pivotally supported upon opposite sides of said middle arm, at points intermediate their length, at 165, 165, their lower ends being normally held against fixed pins 166, by springs 167 and their upper ends terminating above the blank on the bed, and so disposed as to engage the rear curved edge of said blank. Said middle arm and the side arms borne by it are moved positively to push the blank forward on the bed and when so moved the middle arm passes along the space between the two lower inside bed wires and the side arms pass along the spaces between the inside and outside bed wires. Thus spaces in the bed are required to permit movement of said arms, or in other words a longitudinally slotted bed is required. Assuming a blank is resting loosely on the bed, as shown in Fig. 14, and the arms are advanced, it will be observed that in case the blank is in any respect out of correct position to be engaged by the feeding-and-bending device it will be adjusted while being moved along on the bed. As a means to move said blank-pushing arms on the shaft 164, a spring 170 encircles the shaft, which is connected at one end to the middle arm and at the other end to the shaft, and an arm 171 is secured to one end of said shaft which is connected by a rod 172 with an arm 173, secured to a horizontal shaft 174, having its bearings in the adjuster-frame, and an arm 175 is secured to said shaft 174, which is connected by a rod 176, with one arm of a bell-crank lever 177, the other arm of which is connected by a link 178, with one arm 179 of a bell-crank lever, pivoted at 180 to an arm on the frame, the other arm 181 of said lever being arranged to be engaged by a cam 182 secured to the gear-shaft 155. The same projection 182 is arranged to lift the arm 181 a short distance, then to hold it in such elevated position, then to again lift it farther and then to disengage it permitting it to return to normal. During each revolution of said gear-shaft the cam 182 is revolved, and as its projection has two rises the arm 181 will be raised a short distance to move the blank-pushing arms forward a short distance, and will then dwell for a short period of time, permitting said arms to dwell for reasons to be hereinafter set forth, and then will be further raised a short distance to further move the blank-pushing arms forward a short distance and complete their advancing stroke. Forward movement of the side arms is checked by striking the supporting-arms 141 of the bed-wires 140, see Fig. 14, but the middle arm continues its forward movement, and independently pivoting said side arms on the middle arm permits such independent relative movements of the arms.

While the blank is being pushed along on the bed it may be necessary to adjust it endwise, and herein means are provided to accomplish this result. Said means comprises a pair of evener plates 185, normally held in elevated position above the ends of the blank, and adapted to fall during the travel of the blank along on the bed, and to strike both ends of the blank, which, it will be understood are extended upward, owing to the longitudinal curvature of the blank, and by first engaging one or the other end acts to move the blank endwise, so that both ends thereof will be caused to occupy the same plane, or some predetermined plane, according to whether it is required that the counters shall have their sides of equal or unequal length. As here shown, said plates are attached to the extremities of a pair of bent arms 186, adjustably secured to a rock-shaft 187, having its bearings in rearwardly extended arms on the adjuster-frame. Said plates and arms bearing them are held in elevated position by a locking-device, which, when disengaged, permits them to fall by gravity. The locking-device here shown, consists of a detent-arm 190, secured to the rock-shaft, and a lever 191, adapted to engage it, which lever is pivoted at a point intermediate its length, at 192, to a part of the adjuster-frame, and means to move said lever into and out of engagement. The means to move said lever 191, may be arranged on the rod 172, and, as here shown, has two pins 193, 194, adjustably arranged on said rod, above and below one end of the lever, and as the rod is moved upward the pin 194 will engage said lever and disengage it from the detent-arm, thus permitting the plates 185 to fall, and as the rod is moved downward the pin 193 will engage said lever and move it into engagement with said detent-arm and restore said arm to normal and lock it and during such return movement will lift the plates 185. A counter-balancing weight 195 is connected with the rock-shaft 187 to control the gravitating movement of plates 185.

The blank is moved along on the bed by and during the initial movements of the blank-pushing arms to a position below the evener-plates, and said evener-plates are then disengaged and permitted to fall, and the blank-pushing arms are then permitted to dwell for a short period of time while the evener-plates act to even the blank, and then the blank, having been evened, is again advanced by the second and final movement of the blank-pushing arms, and during such time the evener-plates still remain in engagement with the ends of the blank. When the blank has been pushed forward on the bed and arrives at the front end thereof, it then may be necessary to correct its longitudinal curvature in order that it may correspond to the arc of the jaws of the feeding-and-bending device, so as to be presented correctly to said jaws. To accomplish this result a form 196 is arranged above the front end portion of the bed, the under side of which is curved longitudinally to correspond to the correct curve the blank shall have and the blank is pushed forward by the blank-pushing arms during its second or final movement beneath said curved form 196 and into the jaws of the feeding-and-bending device. Said form 196 has an upwardly extended shank 197 adapted to receive a bolt 198 by which said shank is attached to a downwardly extended leg 199 on a block 200, which is provided with a shank 201, extended up through a block 202, secured to a cross-bar 203, of the adjuster-frame. The block 200 is thus stationarily supported in its different vertically adjusted positions. Owing to the transverse curvature of the blank not being in parallel with the engaging-faces of the jaws said jaws, when closing upon it, will act to tip it up or otherwise displace it, hence it becomes necessary to provide means to positively engage and hold it after it has been projected into the open jaws, while said jaws act to close upon it. As a means to positively engage and hold the blank at this time a pair of lifting-levers 205 are provided on the blank-adjuster and arranged in the space between the inside and outside bed-wires thereof, which are adapted to be moved upward against the under side of the blank, to press said blank up into engagement with the curved form 196. Said lifting-levers are also designed to exert a forward pressure on the blank, tending to thrust the blank into the space between the jaws of the nipper-members. Said lifting-levers 205 extend lengthwise the bed and are attached at their rear ends to a rock-shaft 206, supported by the adjuster-frame, and their front ends being depressed beneath the blank and formed with inclined faces to engage the end portions of the blank and lift them into engagement with the form. Said rock-shaft 206, has a short arm 207, which normally rests on an extension of one of the arms 141, which serves as a stop to limit the movement of the shaft in one direction, and thereby limit downward movement of said levers. The shaft 206 is rocked for the purpose of lifting the levers and has secured to it a downwardly extended arm 208, with a lateral extension adapted to be engaged by a lever 209, secured to the rock-shaft 164. The lever 209 is normally arranged quite remote from the arm 208, so that it will not engage said arm until the blank arrives at the front end of the bed, and is thrust into the blank-engaging nippers and then while the blank-pushing arm 160 remains at rest, having reached the end of its stroke, said arm 209 will operate to lift said levers 205 and press the blank into engagement with the form. Such independent movement of the arm 209 with respect to the arm 160 is permitted by the spring 170. As the lever 209 is rigidly connected with the rock-shaft 206 it is restored by it, and the levers 205 are restored by gravity when the arm 208 is disengaged by the lever 209.

The feeding-and-bending device will now be described, reference being had to Figs. 18 to 29:—It is designed particularly to take the blank from the blank-adjuster and to bend it into heel form and deliver it to the compressing-mechanism, although at the time it is taken from the blank-adjuster it is curved longitudinally to a slight extent and is usually curved transversely. The present feeding-and-bending device has substantially the same capabilities as the feeding-and-bending device of my application above referred to, in that it is adapted to bend the blank into heel form while delivering it to the compressing-mechanism, but the present feeding-and-bending device has additional capabilities to especially adapt it to the work which it has to perform, and is, therefore, an improvement upon the feeding-and-bending device of said application.

Referring to the present feeding-and-bending device 215 represents the head of said device which is made as a yoke, and arranged at the top of a vertical spindle 216, having its bearing at the end of a longitudinally adjustable arm 217, mounted on the upright bar 152, and arranged to oscillate in a horizontal plane about said bar as an axis, the extent of oscillation being sufficient to move the head far enough to convey the blank from the blank-adjuster to the compressing-mechanism, or, as shown in Fig. 18, from the dotted to the full line position. To oscillate said arm 217 a link 218 connects said arm with one arm 219 of a bell-crank lever, mounted to turn on a bar 220, the other arm 221 of said lever engaging a cam 222, secured to the rotating gear-shaft 155, which is adapted to make one revolution at each operation of the machine. Said cam acts to move the arm and head borne by it from the dotted to the full line position shown in Fig. 18, and to permit return of the same, and a strong spring 223 is connected at one end to an arm 224, rigidly secured to the bell-crank lever 219—221, and at the other end to the frame which acts to return said arm 217, moving it from the full to the dotted line position shown in Fig. 18. The head is also adapted to be oscillated with respect to the arm 217, during its travel from the blank-adjuster to the compressing-mechanism for the purpose of presenting the blank-engaging nippers borne by it first to the blank-adjuster to receive the blank and then to the compressing-mechanism to deliver the blank, and the extent of such oscillation is here shown as approximately ninety degrees. To accomplish this result an arm 225 is secured to the lower end of the spindle 216 below the arm 217, which extends radially from said spindle, in a horizontal plane, and said arm bears at its extremity a roll 226, which enters a groove or way formed in a rigidly supported member 227, see Fig. 3. The groove or way is made continuous from end to end of said member 227, or thereabout, and is here shown as formed approximately as a right angle, only enough relative deflection being provided to permit freedom of motion. Referring to Fig. 3, the right angled bend of the groove or way represents an intermediate position of the head, it being the point where the head is oscillated, and the straight portions at each side of said bend providing for movements of the head in direct lines. As the arm 217 is oscillated the roll 226 is caused to move along the groove or way from end to end thereof or thereabout, and the arm 225 is swung and the head correspondingly oscillated. Three pairs of blank-engaging nippers are arranged on the head, one to engage the middle of the blank and two to engage the sides thereof. 230, 231, Figs. 26 to 28 represent respectively the upper and lower nipper-members of the middle pair, which are pivotally connected together at 232, one of said members, as 230, being made as a bifurcated plate, having trunnions at its rear end by which it is pivotally supported at 233 to the head-frame, and the other member as 231 is arranged in the space between the bifurcated portions of said member 230. The member 231 is employed as the movable member, and closing means are provided for it. As here shown, said member is connected by a link 234, with an arm 235, secured to a rock-shaft 236, having secured to it a hub bearing a short arm 237, pivotally connected by a link 238, to one arm 239 of a bell-crank lever, which is secured to a shaft 240, the other arm 241 of said lever having a pin 242, which is extended into position between two actuating-levers 245, 246, see Figs. 1 and 18, so as to be struck by either one of said levers and moved accordingly in one or the other direction. Both of said actuating-levers are pivotally supported intermediate their length on the upright bar 152, of the main frame, and are provided at their outer extremities with rolls adapted to be engaged by cams formed on opposite sides of the disk 247, which is arranged between said levers and is secured to the gear-shaft 155. As said cam-disk revolves, first one and then the other actuating-lever is operated, the lower lever 245, acting through the aforesaid connections to move the member 231 and close the jaws of the nippers, and the upper lever 246, acting through said connections to move said member 231, and open the jaws of the nippers.

A spring 244 is arranged on the shaft 236, which is connected at one end with the shaft and at the other end with the head-frame which acts to assist in closing the nipper-jaws.

The two side blank-engaging nippers are made alike or substantially so, and referring to Figs. 23 to 25 one of said pairs of nippers is shown. 250, 251, represent, respectively, the upper and lower nipper-members which are pivotally connected together at 252, one of said members, as 250, being stationarily supported on the nipper frame 254, and the other member 251 being movable. The movable nipper-member 251, is connected by a link 255, with a short arm 256, secured to a shaft 257, extended through the nipper-frame, and said shaft has fixed to it a detent-arm 260, adapted to be engaged and held by a spring-pressed detaining-pawl 261, pivoted to the nipper-frame at 262, to hold the nipper-member 251 in open position, see Fig. 24. As a closing-means for said nipper-member the detaining-pawl has a pin 263 adapted to be engaged by a pin 264, on a sliding rod, as 265, supported by the head-frame, which is adapted to be moved longitudinally in opposite ways, one way to engage and the other way to disengage said pin, and thus move the detaining-pawl and disengage it from the detent-arm 260. Said rod 265 also has two pins 266, 267, arranged a short distance apart, and a short arm 270, fixed to the shaft 240, has a pin 271, which is arranged between the aforesaid pins 266, 267, which, as said shaft 240 is rocked acts to engage first one and then the other pin to thus move the shaft 265 in opposite directions. The detaining-pawl having disengaged the detent-arm the shaft 257, is free to move on its pivot and is moved by a closing-spring 272, to close the nipper-member. To open said nipper-member against the force of said closing-spring 272, an arm 275 is connected with the detent-arm, preferably formed integrally therewith, having a laterally extended pin 276, which is adapted to be engaged by a cross-bar 277, supported upon and free to slide along on a guide-rod 278, supported on the head-frame and connected by links 279, with arms 280, which are secured to the rock-shaft 240, and, as said arm is rocked, the cross-bar is moved to engage the pin on the arm 275 and thus positively move said arm 275 to return the detent-arm into engagement with the spring-pressed detaining-pawl and thus open the nipper-member.

As there are two pairs of side nippers, substantially all the parts just described will be made in duplicate, and arranged on the head-frame, on each side of the middle nipper, such duplicate parts, however, being not necessary to describe in detail, but herein they are identified by the same reference characters. The three pairs of nippers are arranged in a row and when normally disposed and open to receive a blank the jaws of the middle pair are arranged in a horizontal plane and the jaws of the side pairs are arranged in planes inclined to the horizontal in opposite ways, to thus engage a blank which is slightly curved longitudinally, and it is herein designed to turn the side nippers on horizontal axes and also to lift said nippers bodily in the arc of a circle, to thus correspondingly move the jaws and bend the ends of the blank upward and inward, while said blank is being held by the middle and side nippers, and said movements are given to the side nippers during the travel of the head from the blank-adjuster to the compressing-mechanism. To accomplish these results the nipper-frames are rotatably supported on the head-frame, and, as here shown, each nipper-frame 254, has a rearwardly extended horizontally arranged pivot-stud 285, and said studs are pivotally connected to the extremities of a pair of oppositely extended arms 286, respectively secured to a pair of horizontal shafts 287, having their bearings in the head-frame, said shafts having secured to them pinions 288, arranged a short distance apart and both engaged by a double rack-bar 289, which is arranged vertically between them, so that vertical movement of said rack-bar acts to revolve said pinions in opposite ways, and to thus move the arms in opposite ways and lift the nipper-frames in the arc of a circle. Said nipper-frames have secured to them guide-plates 290, which engage one or the other side of a recessed guideway 291, on the head-frame, and as the nipper-frames are pivotally connected with the arms 286 it will be seen that as the arms are moved and the nipper-frames lifted by them, said nipper-frames will be turned on their pivots in opposite ways, hence the nipper-frames are turned while being lifted, the combined movements acting to bend the ends of the blank in an upward and inward direction and cause the blank to assume a heel-form. To move the rack-bar vertically, as here shown, its lower end is loosely connected to a short arm 295, see Fig. 21, secured to a shaft 296, to which is secured an arm 297, to the extremity of which the upper end of a rod 298 is loosely connected, the lower end of said rod, see Fig. 30, being loosely connected to the lower end of the spindle 216 by an arm 299, and a roll 300 is provided at the connection of the lower end of said rod 298 with the arm 299, which is adapted to enter a cam-groove 301, in a plate 302, adjustably secured to a post 303, see Fig. 4, adjustably supported by the main-frame. Said cam-plate, it will be understood, is stationarily supported, and the head-frame bearing the nippers is adapted to swing in the arc of a circle and also oscillate, therefore said roll 300 will be moved into and out of engagement with said cam-plate as the head-frame is thus moved. As the nippers are thus moved all the parts borne by them are likewise moved and the pins 263 on the detaining-pawls 261 are moved into and out of the path of movement of the pins 264, on the sliding bars 265.

When the head bearing the several pairs of nippers is moved into position in front of the blank-adjuster the nippers are open, the blank-adjuster is moved forward carrying with it a blank and the blank is thrust into engagement with the nippers, with its straight edge projecting forward and bent to a proper arc to be engaged by all three pairs of nippers. The nippers are then closed by the automatic means provided for closing them to engage the straight edge of the blank, then the blank-adjuster is moved rearward to return to the pick-up device and the nipper-bearing head is swung to convey the blank to the compressing-mechanism. It is quite necessary that the nipper-bearing head and blank-adjuster shall be correctly disposed relative to each other when the blank is moved into engagement with the nippers, and to accomplish this result coöperating centering-means are provided. As here shown, a vertical pin 305 on the head is adapted to enter between the arms of a fork 306, formed on a block 307, adjustably mounted on the post 201, on the blank-adjuster, and as the head is swung into position in front of the blank-adjuster and the blank-adjuster is advanced, the fork engages said pin. On the front side of the support 199 of the curved form 196, projections 308 are formed, which have inclined faces to engage the stationary nipper-members 251, when the blank-adjuster is advanced, to thus correctly position and hold said nipper-members in the arc of the curved forming-means on the blank-adjuster, to adapt them to correctly engage the blank which is presented to them.

The compressing-mechanism for the blank will now be described, see Figs. 1, 3, 4 and 31 to 40. 310 represents a heel-shaped counter-former which is supported on a rock-shaft 311, mounted to rock in bearings on the main-frame. Said former is designed to occupy a vertical and an inclined position, and receives upon it a blank when in vertical position, and permits discharge of the molded counter when in inclined position. To move the former, as here shown, it is connected by a link 312, to an arm 313, secured to a rock-shaft 314, borne by the main frame, said shaft having secured to it an arm 315, which is connected by a rod 316, to one end of a pivoted lever 317, the other end of said lever, with or without a roll thereon, being engaged by a cam 319, secured to the upright gear-shaft 155. By the connections just described, the former is positively moved from a vertical to an inclined position by the cam 319, which permits return of the same to a vertical position; and to return said former a weight 320 is employed, which is connected to an arm 321, secured to said rock-shaft 314.

When the former is in its vertical position it is designed to be securely held, and for this purpose a locking-device is provided, here shown as a striker 325 secured to the back of the former, which is adapted to engage a latch 326, pivoted at 327, to an adjustable support 328, on the main-frame. Said latch is adapted to be lifted to disengage the striker, and, as here shown, the means to lift the latch comprises an arm 330, to engage the latch, which is secured to a rock-shaft 331 and an arm 332, extended from the opposite side of said shaft having an adjusting-pin on it to engage a link 335, which is movable up and down, as will be hereinafter described. As said link descends it engages the adjusting-pin on the arm 332, and rocks the shaft 331, and lifts the arm 330, and thereby raises the latch, and as said link rises it disengages the adjusting-pin on the arm 332, and permits said latch to fall by gravity.

A pair of compressing-jaws are arranged respectively at opposite sides of the former, 340, 341, representing said jaws, and each jaw has a molding-face which includes one side and one-half of the heel end of the counter. Each jaw has a pivot-stud 342 near its lower end on which the jaws turn, and said pivot-studs respectively enter holes in plates 343, which are adjustably secured in upright position to a frame 344, adjustment of said plates providing for adjustment of the compressing-jaws relative to the former. Said pivoted compressing-jaws are arranged with their lower ends in engagement with each other, whereby they are caused to move alike, the engaging-means adapted to permit of a rocking movement relative to each other about the pivot-studs as center, and, as here shown, one of said jaws has a transverse rib 365, to serve as a rocker or pivotal support, and the other jaw has a transverse groove 366, to receive said rib, and which serves as a seat for it. Said jaws are or may be heated, and, as here shown, they are provided with electric heating-devices 367, see Fig. 34. The frame 344 bearing said jaws is movable vertically to operate the jaws, and, as here shown, said frame has ears 345, arranged in pairs at its upper and lower ends, which are bored to receive and slide freely on a pair of vertical guide-rods 346, stationarily supported upon the main-frame. Said jaw-carrying frame 344, has at each side a laterally extended ear 347, to which the lower ends of a pair of upright rods 348, are adjustably connected, the upper ends of said rods extending upward through holes 349, in a yoke 350, pivotally supported at 351, and bearing rolls 352 at their free ends adapted to engage cams 353. The upper ends of said rods 348 have arranged on them strong spiral springs 355, the upper ends of said springs bearing against plates 356, adjustably secured to the rods and their lower ends bearing against plates 357, which rest on the levers 350. As the cams 353 revolve said yoke 350 is raised and lowered, and upward movement of said yoke compresses the springs 355 which act to lift the jaw-carrying frame 344, to force the compressing-jaws upward toward the former with a yielding pressure from the position shown in Fig. 34 to the position shown in Fig. 35.

As the compressing-jaws are moved upward by the frame 344 toward the former, means are provided to cause them to turn on their pivots or rock, so that by the time the heel ends of the jaws arrive in position to engage the heel end of the blank on the former, the jaws will have been moved inward toward the former far enough for the sides thereof to engage the sides of the blank on the former and a smooth molding-face to be produced at the heel end. The means here shown to move inward the compressing-jaws, as represented in Figs. 1, 3, 31 and 34, consists of links 370, connecting the jaws respectively with arms 371, secured to horizontal shafts 372, having their bearings upon and at opposite sides of the jaw-carrying frame 344, to move up and down with said frame, and arms 373 secured to said shafts 372, which extend over upon and continuously engage the upper sides of arms 374, secured to the upper ends of the upright guide-rods 346, said arms 373, having attached to them strong springs 375, which act to hold them in continuous engagement with said fixed arms 374. As the jaw-carrying frame 344 rises the arms 373, being held by the springs in continuous engagement with the fixed arms 374, cause the shaft 372 to rock and the compressing-jaws to be turned on their pivots and moved inward by a longitudinal thrust of the links, and as said frame descends said arms 373, while still being held against said fixed arms 374, cause the compressing-jaws to turn on their pivots in the opposite direction and move away from the former. Such compression alone, however, is insufficient, hence further compression is provided for, which is obtained, as here shown, by the formation of the cams 353. Referring to Fig. 4, the cams 353 have a quick rise at 360 to effect the initial compression shown in Fig. 35, and following said quick rise have a gradually increasing rise 361, to effect further and final compression, and as said gradually increasing rise passes under the yoke 350, said yoke is further raised and additional compression applied to the compression-jaws.

The blank is presented to the mold edgewise by the feeding-and-bending device, with its straight edge held by the blank-engaging nippers, and is so held until its forward edge is engaged by the compressing-jaws and former when the nippers are operated to disengage it, and said straight edge is then turned over to form an inturned flange on the counter. In turning over the flange care must be taken to prevent breaking the same at the bend, particularly when the stock employed is not of the best, hence an improved form of flanging device, as compared with the flanging-device of my aforesaid application, is here shown. Like the flanging device of my said application the present flanging-device is adapted to be moved over the face of the mold and to finally apply a flat pressure to the overturned flange, but in addition to these capabilities the present flanging-device is adapted to turn the flange without breaking it at the bend.

380 represents the flanging-plate which is made as a flat plate formed with a V-shaped end, which is adapted to move over the flat face of the mold. Said plate 380 is supported in upright position upon the back side of a pair of upright plates 385, and is guided to slide longitudinally on said plates 385; and, as here shown, said plates 385 have edge guides 386, to receive between them the plate 380. and said plate 380 has a wide projection 381 on its front side which enters the space between the plates 385. Said flanging-plate is moved vertically over the face of the mold from a position below that shown in Fig. 37 to the position shown in Fig. 38, and to thus move it vertically said plate is connected by a pair of links 390, with arms 391, of a yoke, which is secured to a shaft 392, to which an arm 393 is secured, which is connected by a link 394, with one arm 395, of a bell-crank lever, pivoted at 396, the other arm 397 of said lever bearing a roll which is engaged by a cam 398, secured to the main-shaft 87. The flanging-plate is arranged to be moved toward and from the face of the mold while moving over said face. Such movement toward and from the face of the mold, however, need not be but little, but is provided to enable the plate to be normally supported a short distance away from the face of the mold and to gradually approach said face as it rises, and finally to be compressed hard against the flange on said face. Such remote position of the flanging-plate during its initial movement permits it to engage the flange remote from the face of the mold, as shown in Fig. 39, so that a sharp bend at the beginning of the flange-turning operation is avoided, and then by gradually approaching the face of the mold to lay down the flange and more and more sharply define the bend, as shown in Fig. 40. To thus support the plate and cause it to gradually approach the mold and finally to be compressed hard upon the flange which is formed by it, the supporting-plates 385, are loosely supported, preferably adjustably, at their lower ends, upon pins 387, which project from the jaw-carrying frame 344, and their upper ends are connected by links 400, with a rod 401, supported by a pair of arms 402, pivotally connected to ears 403 on the main-frame. A link 404 loosely connects said rod with an actuating-rod 405, which extends to and is loosely connected with an arm 406, secured to a rock-shaft 407, to which a cam-lever 408 is secured, having yielding-means to be engaged by a cam 409, which is secured to the main-shaft 87. Said yielding-means comprises an arm 412, pivotally connected to the under side of the lever 408, which has a roll to engage the cam 409, and a spring-pressed pin 413, normally engaging said lever 412, which is borne by and projects through a hole in the lever 408. To control the movement of said lever-connections a pair of short arms 415, are arranged on the rod 401, which are connected by a pair of links 335, with an extension 416 at the upper end of the frame 344.

The jaw-carrying frame rises to give to the compressing-jaws their initial movements and secondary movements, and during the latter part of its upward movement the flanging-plate rises, and the supporting-plates 385 are moved in a direction toward the face of a mold to cause the flanging-plate to gradually approach the face of the mold as it rises. Such inward movement of the supporting-plates 385 are caused by the lever-connections thus described, by the lever-connections thus described, acting to move the rod 401 in a direction toward the left, see Fig. 31, when operated by the cam 409.

The initial movement of the supporting-plates 385 act to control the position of the flanging-plate with respect to the mold, causing said plate to approach the face of the mold, but this result having been accomplished said plates 385 are then operated to apply to said flanging-plate a severe flat pressure upon the overturned flange. The formation of the cam 409 is relied upon to obtain both the initial and secondary movements of the supporting-plates, and, as shown in Fig. 31, a quick rise 420, of said cam acts to operate the lever-connections to give to the supporting-plates their initial movements and a slow rise 421, following the quick rise, acts to give to said supporting-plates their secondary movements, which, it will be understood is a movement in the same direction as the initial movement. The secondary movements of the supporting-plates, whereby the flat pressure is applied to the flange, may and preferably does take place during the latter part of the secondary movement of the frame 344, so that a severe pressure is applied to the flange at the same time that severe pressure is applied to the blank, and this result is easy of accomplishment for the reason that the flanging-plate and its supporting plates are borne by said frame. During the last part of the secondary movements of the compressing-jaws, while they are acting to give to the blank a final severe squeeze, and the flanging-plate is being given its secondary movement to severely flat-press the flange, the compressing-jaws and flanging-plate are all moved upward a short distance, as they are all borne by the same carrying-frame, and during this short upward movement the flanging-plate acts to slide over the flange and iron it. The counter having been formed on the former and compressed, it is next discharged from the former, and to accomplish this result the former is swung forward on its pivotal-support 311, as shown in Fig. 4, to move its lower end over a suitable space in which a receptacle 425 is arranged to receive the discharged counter. The former is moved forward by means heretofore described. On the face of the former a thin plate 426 is arranged, which is adapted to slide longitudinally, and said plate has an ear 427, to which the lower end of a link 428 is connected, the upper end of said link being connected to an arm 429, secured to a rock-shaft 430, having secured to it an arm 431, adapted to be struck by a pin 432, on the side of the gear-wheel 90. Once during each revolution of said gear-wheel 90 the pin 432 strikes the arm 431 and rocks the shaft 430 and depresses the arm 429 and moves the sliding discharging-plate downward into the full line position shown in Fig. 4, and the molded-counter is discharged. Return movement of the arm 431 is limited by an arm 433 secured to the rock-shaft 430, and such return movement is produced by a weight 434 connected with the rock-shaft. The receptacle 425 into which the counter falls is borne by an arm 435, secured to a rock-shaft 436, having a short arm 437, which is connected by a link 438, with an arm 439, secured to a rock-shaft 440, having a short arm 441, connected by a rod 442, with an arm 443, secured to a shaft 444, bearing an arm 445, having the roll thereon which engages a cam 446, secured to the gear-shaft 155. As the cam 446 revolves by means of the connections thus described the receptacle 425 is lifted from the full to the dotted line position shown in Fig. 41, and the counter is conveyed to a chute from which it passes to any suitable receptacle, not shown.

I claim:—

1. In a counter-forming machine, an intermittently revoluble turret, a plurality of blank-holders borne by it, each arranged to contain a pile of blanks, means to revolve said turret, retaining-means to engage the turret and hold it at rest, means to automatically operate said retaining-means to disengage the turret and permit it to revolve upon the completion of several successive operations of the machine, and means to remove the blanks one at a time from the holders, substantially as described.

2. In a counter-forming machine, a turret, a plurality of blank-holders borne by it, each arranged to contain a pile of blanks, means to revolve said turret, retaining-means to engage the turret and hold it at rest, means to operate said retaining-means to disengage the turret and permit it to revolve, and means operated intermittently and in correspondence with the operations of the machine to move the aforesaid means to operate said retaining-means upon the completion of several successive operations of the machine, substantially as described.

3. In a counter-forming machine, a turret, a plurality of blank-holders borne by it, each arranged to contain a pile of blanks, means to revolve said turret, retaining-means to engage the turret and hold it at rest, intermittently operated means to actuate said retaining-means to disengage the turret and permit it to revolve, and means operated intermittently in correspondence with the operations of the machine to intermittently operate the aforesaid means, whereby the retaining-means is operated to disengage and permit movement upon the completion of several successive operations of the machine, substantially as described.

4. In a counter-forming machine, the combination of a pick-up device having means to engage the top blank of a pile, means to operate said pick-up device, a turret, a plurality of blank-holders borne by said turret, each arranged to contain a pile of blanks, and intermittently operated means to revolve said turret to present the several blank-holders to the pick-up device, constructed and arranged to permit said turret to dwell in its different positions during several successive operations of said pick-up device, substantially as described.

5. In a counter-forming machine, a pick-up device to engage the top blank of a pile and remove it from a holder comprising a pair of diverging spurs, means to support them, and means to move them in opposite ways to cause them to penetrate the surface of the blank, substantially as described.

6. In a counter-forming machine, a pick-up device to engage the top blank of a pile and remove it from a holder comprising a pair of diverging spurs, means to support them, means to move them in opposite ways to cause them to penetrate the surface of the blank, and means to lock them while in engagement with the blank and thus hold them while the blank is being removed, substantially as described.

7. In a counter-forming machine, a pick-up device to engage the top blank of a pile and remove it from a holder comprising a pair of diverging spurs, means to support them, means to move them in opposite ways to cause them to penetrate the surface of the blank, means to lock them while in engagement with the blank and thus hold them while the blank is being removed, and means to disengage said locking-means to permit withdrawal of the spurs from the blank, substantially as described.

8. In a counter-forming machine, a pick-up device to engage the top blank of a pile and remove it from a holder, comprising a pair of diverging spurs, means to move them in opposite ways to cause them to penetrate the surface of the blank, means to lock them while in engagement with the blank and thus hold them while the blank is being removed, means to disengage said locking-means to permit withdrawal of the spurs from the blank, and means to withdraw the spurs from the blank, substantially as described.

9. In a counter-forming machine, a pick-up device to engage the top blank of a pile and remove it from a holder comprising a pair of diverging spurs, pivoted arms bearing them, means to move said arms in opposite ways to cause the spurs to penetrate the surface of a blank, and means to return said arms to normal to withdraw the spurs from the blank, substantially as described.

10. In a counter-forming machine, a pick-up device having means to engage the top blank of a pile contained in a holder, a pivoted arm to the extremity of which said device is pivotally connected, and a cam engaging said arm which is cut away to permit said arm to move and allow the pick-up device to descend at least to the bottom of the holder to engage the top blank of a pile of any height which is contained in said holder, substantially as described.

11. In a counter-forming machine, a blank-adjuster, a pick-up device having means to engage the top blank of a pile contained in a holder, movable vertically and also sidewise, means to control the vertical movements of said device, and means to move it sidewise to remove the blank from the holder and deliver it to the blank-adjuster, substantially as described.

12. In a counter-forming machine, a blank-adjuster, a pick-up device having means to engage the top blank of a pile contained in a holder, movable vertically to engage a blank and remove it from the holder and again movable vertically to deliver said blank to the blank-adjuster, and means to control said vertical movements of said device, substantially as described.

13. In a counter-forming machine, a pick-up device having means to engage the top blank of a pile contained in a holder, movable vertically to engage the blank and remove it from the holder and again movable vertically to deliver said blank to the blank-adjuster, and means to control said vertical movements of said device, and means to move said device sidewise after its first vertical movement and before its second, substantially as described.

14. In a counter-forming machine, a pick-up device having diverging spurs and an actuator to move said spurs in opposite ways to engage the top blank of a pile contained in a holder, said device being movable vertically to engage the blank and remove it from the holder, said spurs being borne by one member of said device and the actuator thereof borne by another member of said device, said members being movable independently of each other to cause the actuator to move the spurs in opposite ways to penetrate the blank on a downward movement of the device, substantially as described.

15. In a counter-forming machine, a pick-up device having diverging spurs, and an actuator to move said spurs in opposite ways to engage the top blank of a pile contained in a holder, said device being movable vertically to engage the blank and remove it from the holder, said spurs being borne by one member of said device and the actuator thereof borne by another member of said device, said members being movable independently of each other to cause the actuator to move the spurs in opposite ways to penetrate the blank on a downward movement of the device, and means to lock said spurs in engagement with the blank, one member of which means is borne by the spur-bearing member and the other member of which is borne by the actuating-member, substantially as described.

16. In a counter-forming machine, a blank-adjuster, a pick-up device having diverging spurs, and an actuating means to move said spurs to engage the top blank of a pile contained in a holder, said device being movable vertically to engage the blank and remove it from the holder, then sidewise to convey it into alinement with the blank adjuster, then again vertically to deliver it upon the blank-adjuster and to return it to normal, said spurs being borne by one member of said device and the actuating means therefor borne by another member thereof, said members being independently movable to permit the actuating-means to move the spurs to cause them to penetrate the blank and subsequently to withdraw them from the blank, and locking-means for the spurs to hold them in engagement with the blank during the sidewise movement of the device, substantially as described.

17. In a counter-forming machine, the combination of a holder adapted to contain a pile of blanks, a pick-up device having means to engage the top blank of a pile, a horizontally arranged blank-adjuster, and means to operate said pick-up device to engage the top blank of the pile and to remove it from the holder and to convey it to and deliver it upon the blank-adjuster, substantially as described.

18. In a counter-forming machine, a blank-adjuster by which the blanks are adjusted as to their position, comprising a horizontal bed upon which a curved blank is delivered, a pair of evener-plates arranged horizontally above the bed and movable vertically to engage the ends of said blank and move said blank endwise on the bed and thus correct its position, and means to operate said evener-plates, substantially as described.

19. In a counter-forming machine, a blank-adjuster by which the blanks are adjusted as to their position, comprising a horizontal bed upon which a curved blank is delivered, means to engage the edge of the blank and push it along on the bed and thus correct its position while it is being moved along, evener-plates arranged horizontally above the bed and movable vertically to engage the ends of said blank and move said blank endwise, and means to operate said evener-plates when the blank approaches the forward end of the bed, substantially as described.

20. In a counter-forming machine, a blank-adjuster by which the blanks are adjusted as to their position, comprising a horizontal bed upon which a blank is delivered, and curved forming-means at the forward end of the bed to correct the longitudinal curvature of the blank, substantially as described.

21. In a counter-forming machine, a blank-adjuster by which the blanks are adjusted as to their position, comprising a horizontal bed upon which the blank is delivered, a curved form arranged at the forward end of the bed, and means to lift the blank into engagement with said form, substantially as described.

22. In a counter-forming machine, a blank-adjuster by which the blanks are adjusted as to their position, comprising a horizontal bed upon which a blank is delivered, a curved form arranged at the forward end of the bed, and pivoted levers to lift the blank into engagement with said form, and means to operate said levers, substantially as described.

23. In a counter-forming machine, a blank-adjuster by which the blanks are adjusted as to their position, comprising a horizontal bed upon which a blank is delivered, means to engage the edge of the blank and push it along on the bed and thus correct its position, and curved forming-means at the forward end of the bed into engaging position with which the blank is pushed, substantially as described.

24. In a counter-forming machine, a blank-adjuster by which the blanks are adjusted as to their position, comprising a horizontal bed upon which the blank is delivered, means to engage the edge of a blank and push it along on the bed and thus correct its position, means to engage the ends of the blank and move it endwise and thus correct its position, and curved forming-means at the forward end of the bed into engaging position with which the blank is pushed, substantially as described.

25. In a counter-forming machine, the combination of a pick-up device, a feeding-and-bending device, a blank-adjuster by which the blanks are adjusted as to their position relative to the feeding-and-bending device, means to move said blank-adjuster to convey a blank from the pick-up device to the feeding-and-bending device, said blank-adjuster having a horizontal bed upon which the blank is delivered, and means to engage the edge of the blank and move it along on said bed and thus correct its position while the blank-adjuster is being operated, substantially as described.

26. In a counter-forming machine, the combination of a pick-up device, a feeding-and-bending device, a blank-adjuster by which the blanks are adjusted as to their position relative to the feeding-and-bending device, and means to move said blank-adjuster to convey the blank from the pick-up device to the feeding-and-bending device, said blank-adjuster having a horizontal bed upon which the blank is delivered, means to engage the edge of the blank and push it along on the bed and thus correct its position while the blank-adjuster is being operated, and means to engage the ends of the blank and to move said blank endwise also while the blank-adjuster is being operated, substantially as described.

27. In a counter-forming machine, the combination of a pick-up device, a feeding-and-bending device, a blank-adjuster by which the blanks are adjusted as to their position relative to the feeding-and-bending device, and means to move said blank-adjuster to convey the blank from the pick-up device to the feeding-and-bending device, said blank-adjuster having a horizontal bed upon which the blank is delivered, means to engage the edge of the blank and push it along on the bed and correct its position while the blank-adjuster is being operated, and means to engage the ends of the blank and to move said blank endwise also while the blank-adjuster is being operated, and a curved forming-means at the front end of the bed into engaging position with which the blank is pushed also while the blank-adjuster is being operated, substantially as described.

28. In a counter forming machine, the combination of a feeding-and-bending device for the blanks, a blank-adjuster to deliver the blanks to said feeding-and-bending device having blank-positioning devices, means to move said blank-adjuster, and means to deliver the blanks to the blank-adjuster, substantially as described.

29. In a counter-forming machine, the combination of feeding-and-bending device for the blanks, a blank-adjuster to deliver the blanks to said feeding-and-bending device, means to move said blank-adjuster, evener-plates on said blank-adjuster, and means to engage a blank and move it along on the blank-adjuster and thus correct its position, said means operating during its initial movement to move said blank to a position beneath the evener-plates and during its secondary movement to move said blank into engagement with the feeding-and-bending device, substantially as described.

30. In a counter-forming machine, the combination of a feeding-and-bending device for the blanks, a blank-adjuster to deliver the blank to said feeding-and-bending device, means to move said blank-adjuster, evener-plates and curved forming-means on said blank-adjuster, means to engage the edge of a blank and move it along on the blank-adjuster and thus correct its position, said means operating during its initial movement to move said blank to a position beneath the evener-plates and curved forming-means, and during its secondary movement to move said blank into engagement with the feeding-and-bending device, and means also operated during said secondary movement to engage the blank and hold it while the blank-engaging devices of the feeding-and-bending device operate to engage it, substantially as described.

31. In a counter-forming machine, a feeding-and-bending device for the blank having a plurality of pairs of blank-engaging nippers, automatic means to operate said nippers, an oscillating head bearing said nippers and a movable support bearing said oscillating head, whereby the head is moved to convey the blank from one group of mechanism to another and is oscillated during its travel to present the nippers first to one and then to the other group of mechanism, substantially as described.

32. In a counter-forming machine, a feeding-and-bending device for the blank having a plurality of pairs of blank-engaging nippers, automatic means to operate said nippers, an oscillating head bearing said nippers, means to oscillate said head, a swinging arm bearing said oscillating head and automatic means to move said arm, substantially as described.

33. In a counter-forming machine, a feeding-and-bending device for the blank having a plurality of pairs of blank-engaging nippers, automatic means to open and close the nipper-members, automatic means to move the side nippers to bend upward the ends of the blank, an oscillating head bearing said nippers, and means to move said oscillating head to convey the blank from one group of mechanism to another, substantially as described.

34. In a counter-forming machine, a feeding-and-bending device for the blank having a plurality of pairs of blank-engaging nippers, automatic means to open and close the nipper-members, automatic means to move the side nippers to bend upward the ends of the blank, an oscillating head bearing said nippers and a swinging arm bearing said oscillating head, and means to move said arm, substantially as described.

35. In a counter-forming machine, a feeding-and-bending device having two side pairs of blank-engaging nippers, arms to which the side nippers are pivotally connected, shafts bearing said arms, pinions on said shafts and a double rack engaging said pinions, and means to move said rack, and means to turn the nipper-frames on their pivotal connections with the arms while they are being lifted by said arms, substantially as described.

36. In a counter-forming machine, a feeding-and-bending device for the blank having two pairs of oscillating side blank-engaging nippers, swinging supports for said side nippers, means to open the nipper-members, means to close the nipper-members, means to move the supports for the side nippers to lift said nippers, and means to turn the nippers on their axes while being lifted, an oscillating head bearing said nippers, and means to move said head to convey the blank from one group of mechanism to another, substantially as described.

37. In a counter-forming machine, a feeding-and-bending device having a middle pair of blank-engaging nippers and two side pairs of blank-engaging nippers, means to move said side pairs of nippers to bend the blank into heel form, and means to operate all of said nippers, substantially as described.

38. In a counter-forming machine, a feeding-and-bending device having a horizontally arranged middle pair of blank-engaging nippers and two side pairs of blank-engaging nippers oppositely inclined with respect to the middle pair, means to oscillate and move upward said side nippers to bend the blank into heel form and means to operate all of the nippers, substantially as described.

39. In a counter-forming machine, the combination of a plurality of pairs of blank-engaging nippers arranged in the arc of a circle, an oscillating head bearing them, a blank-adjuster having curved forming-means for the blank by which the blank is presented to the nippers, and coöperating centering-means arranged on the oscillating head and blank-adjuster to correctly position said parts with respect to each other when brought into engagement, substantially as described.

40. In a counter-forming machine, the combination of a plurality of pairs of blank-engaging nippers arranged in the arc of a circle, an oscillating head bearing them, a blank-adjuster having curved forming-means for the blank by which the blank is presented to the nippers, coöperating centering-means arranged on the oscillating head and blank-adjuster to correctly position said parts with respect to each other when brought into engagement, and means on the blank-adjuster to engage the side nippers to correctly position them with respect to the curved forming-means on said blank-adjuster, substantially as described.

41. In a counter-forming machine, the combination of a mold, a middle pair of nippers and two side pairs of nippers arranged to hold a curved blank and present it to the mold, said middle pair of nippers being loosely supported to provide self-adjustment to correctly present the blank to the mold, means to support said nippers, and means to move them to deliver the blank to the mold, substantially as described.

42. In a counter-forming machine, the combination of a mold, a feeding-and-bending device to engage the blank and bend it into heel form and deliver it to the mold, a blank-adjuster on which the blank is laid, positioning-means for the blank arranged on said blank-adjuster and means to operate said positioning-means, whereby the blank is correctly positioned with relation to the feeding-and-bending device and is moved forward on the blank-adjuster into engagement with the feeding-and-bending device and then delivered to the mold, substantially as described.

43. In a counter-forming machine, the combination of a mold, a feeding-and-bending device to engage the blank and bend it into heel form and deliver it to the mold, a blank-adjuster on which the blank is laid, positioning-means for the blank arranged on said blank-adjuster and means to operate said positioning-means, whereby the blank is correctly positioned with relation to the feeding-and-bending device and is moved forward on the blank-adjuster into engagement with the feeding-and-bending device and then delivered to the mold, and automatic means to deliver the blanks to the blank-adjuster, substantially as described.

44. In a counter-forming machine, the combination of a mold, a blank-adjuster, a feeding-and-bending device having an oscillating head, and means to move said device toward and from the blank-adjuster and to oscillate it and then move it toward and from the mold thereby to receive a blank from the blank-adjuster and deliver it to the mold, substantially as described.

45. In a counter-forming machine, the combination of a former, a pair of compressing-jaws pivotally supported at their lower ends and having engaging-portions between them, a frame bearing said jaws, a pivoted lever with which said frame is yieldingly connected, and a cam to move said lever, substantially as described.

46. In a counter-forming machine, the combination of a former, a pair of compressing-jaws pivotally supported at their lower ends, a frame bearing them having an initial and a gradually increasing secondary movement in a direction toward the former, to correspondingly move the jaws, and means to move said jaws on their pivots, substantially as described.

47. In a counter-forming machine, the combination of a former, a pair of compressing-jaws pivotally supported at their lower ends, and a reciprocating frame bearing said jaws, means connected with said frame to move said jaws on their pivots, and means to impart to said frame an initial movement followed by a secondary movement in the same direction, to cause the jaws to engage the blank during the initial movement and to severely compress the blank during the secondary movement, substantially as described.

48. In a counter-forming machine, the combination of a counter-forming mold, a flanging-plate to move over the face of said mold, means to support said plate remotely from the plane of the face of the mold and at an inclination to said face, and means to move said plate over said face, and means to move it toward said face while it is being moved over said face, substantially as described.

49. In a counter-forming machine, the combination of a counter-forming mold, a flanging-plate adapted to move over the face of said mold, a support on which said plate moves, said support being arranged to hold said plate remotely from the plane of said face, means to move said plate on its support over said face, and means to move said support in a direction toward said face, substantially as described.

50. In a counter-forming machine, the combination of a counter-forming mold, a flanging-plate adapted to move over the face of said mold, an inclined support for said plate arranged in front of said face, to hold said plate remotely from the plane of said face, means to move said plate over said face, and means to move its support in a direction toward the mold face while said plate is being moved over said face; substantially as described.

51. In a counter-forming machine, the combination of a counter-forming mold, a plate adapted to move over the face of said mold and to approach said face gradually while moving over it to form a flange, means to move said plate over the face of the same, and means having an initial and secondary movement to move said plate toward said face while it is being moved over said face during its initial movement and then to apply a severe pressure to said plate on the secondary movement, substantially as described.

52. In a counter-forming machine, the combination of a counter-forming mold comprising a former and a pair of compressing-jaws and a flanging-plate movable over the face of the mold and in a direction toward and from said face, a vertically movable frame bearing said jaws and flanging-plate, means to move the jaws into, and means to move the flanging-plate independently of but in the same direction as the frame while it is being moved by the frame, and means to move said flanging-plate toward the face of the mold with a gradually increasing pressure while said flanging-plate is being moved over the face of the mold, substantially as described.

53. In a counter-forming machine, the combination of a counter-forming mold comprising a former and a pair of compressing-jaws, a flanging-plate movable over the face of the mold and in the direction toward and from said face, a vertically movable frame bearing said compressing-jaws and flanging-plate, means connected with said frame to move said jaws on their pivots, and means to move said flanging-plate over the face of the mold independently of the frame, and means independent of the frame to move said flanging-plate in a direction toward the face of the mold while it is being moved over said face, substantially as described.

54. In a counter-forming machine, the combination of a counter-forming mold comprising a former and a pair of compressing-jaws and a flanging-plate movable over the face of said mold and in a direction toward and from said face, a frame bearing said compressing-jaws and flanging-plate, means to move said frame vertically having an initial and a gradually increasing secondary movement, means connected with said frame to move said jaws inward while they are being moved upward by the frame, means to move said flanging-plate independently of the frame over the face of the mold, and means to move said flanging-plate in a direction toward the face of the mold having an initial and a gradually increasing secondary movement, substantially as described.

55. In a counter-forming machine, the combination of a movable former, compressing-jaws, means to move the former into and out of coöperative relation with said jaws, a discharging plate slidably mounted on the face of the former, and means to move said plate to discharge the molded counter, substantially as described.

56. In a counter-forming machine, the combination of a movable former, compressing-jaws, means to move the former into and out of the plane of movement of said jaws, a face-plate slidably arranged on said former and conforming to the contour thereof over upon which the flange of the counter is turned, and means to move said plate relative to the former to discharge the molded counter, substantially as described.

In testimony whereof, I have signed my name to this specification, in the presence of two subscribing witnesses.

ALBERT F. JONES.

Witnesses:
B. J. NOYES,
H. B. DAVIS.